United States Patent
Kawamura et al.

(10) Patent No.: US 7,948,356 B2
(45) Date of Patent: May 24, 2011

(54) PORTABLE TERMINAL

(75) Inventors: Hiromi Kawamura, Hiroshima (JP);
Masayuki Imada, Hiroshima (JP)

(73) Assignee: Panasonic Corporation, Osaka (JP)

( * ) Notice: Subject to any disclaimer, the term of this patent is extended or adjusted under 35 U.S.C. 154(b) by 778 days.

(21) Appl. No.: 11/666,688

(22) PCT Filed: Oct. 11, 2005

(86) PCT No.: PCT/JP2005/018707
§ 371 (c)(1),
(2), (4) Date: May 1, 2007

(87) PCT Pub. No.: WO2006/048997
PCT Pub. Date: May 11, 2006

(65) Prior Publication Data
US 2009/0315667 A1    Dec. 24, 2009

(51) Int. Cl.
*G05B 23/02* (2006.01)
(52) U.S. Cl. ....................................................... 340/3.1
(58) Field of Classification Search .................. 340/3.1, 340/7.32; 455/558, 574, 127.5, 343.1; 365/226; 713/300, 320, 323, 324
See application file for complete search history.

(56) References Cited

U.S. PATENT DOCUMENTS

| | | | | |
|---|---|---|---|---|
| 5,802,379 | A | * | 9/1998 | Boatwright et al. .......... 713/324 |
| 2002/0115481 | A1 | * | 8/2002 | Saito .............................. 455/574 |

FOREIGN PATENT DOCUMENTS

| | | |
|---|---|---|
| JP | 8-234872 | 9/1996 |
| JP | 11-191797 | 7/1999 |
| JP | 11-338575 | 12/1999 |
| JP | 2002-222442 | 8/2002 |
| JP | 2004-110229 | 4/2004 |

* cited by examiner

*Primary Examiner* — Edwin C Holloway, III
(74) *Attorney, Agent, or Firm* — Wenderoth, Lind & Ponack, L.L.P.

(57) ABSTRACT

A mobile terminal is capable of reducing unnecessary consumption of electric power. The mobile terminal includes a terminal status detecting unit which detects a first terminal status and a second terminal status, the first terminal status being a status of the mobile terminal before a change in the mobile terminal takes place, and the second terminal status being a status of the mobile terminal after the change in the mobile terminal takes place. The mobile terminal also includes a condition managing table which manages a condition for starting an electric power supply to an SD memory card, a judging unit which judges, when the first terminal status and the second terminal status are detected by the terminal status detecting unit, whether or not the change in the status of the mobile terminal meets the condition, and an electric power supplying unit which starts the electric power supply to the SD memory card when the change in the status of the mobile terminal is judged by the judging unit as meeting the condition.

13 Claims, 22 Drawing Sheets

FIG. 8

| Terminal status | User action | Post-action terminal status | SD memory card use possibility | |
|---|---|---|---|---|
| Switch OFF | Turn on switch | Switch ON | No | 910 |
| Switch ON | Null | Standby | No | 911 |
| Standby | Null | Standby | No | 912 |
| Standby | Access data folder | Data access | Yes | 913 |
| Standby | Activate address book application | Accessing address book | No | 914 |
| Standby | Start Web access | Web access | No | 915 |
| Standby | Activate music reproduction application | Music reproduction | Yes | 916 |
| Standby | Activate image capture application | Image capture | Yes | 917 |
| Standby | Activate image recording application | Image recording | Yes | 918 |
| Accessing address book (after activating address book) | Edit address book | Data access | Yes | 918a / 919 |
| Accessing mail (after activating mail) | Edit mail | Data access | Yes | 920 |
| Standby | Place in electric field | Contactless communication | No | 921 |
| Contactless communication | Remove from electric field | Standby | Yes | 922 |

| First terminal status 701 | Second terminal status 702 |
|---|---|
| Switch ON | No information |

| First terminal status 701 | Second terminal status 702 |
|---|---|
| Switch ON | Standby |

| First terminal status 701 | Second terminal status 702 |
|---|---|
| Standby | Image capture |

401

FIG. 15A Open judgment angle : $\theta 0$
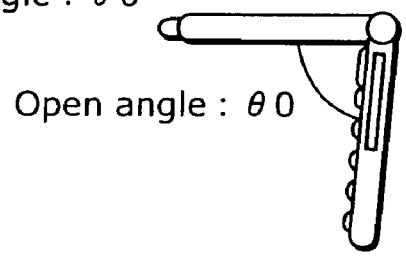
Open angle : $\theta 0$
FIG. 15B Standby status : $\theta 0 > (\theta 1 = 0)$
FIG. 15C Half-opened : $\theta 0 > \theta 2$
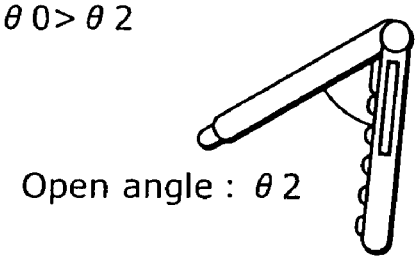
Open angle : $\theta 2$
FIG. 15D Opened : $\theta 0 \leqq \theta 3$
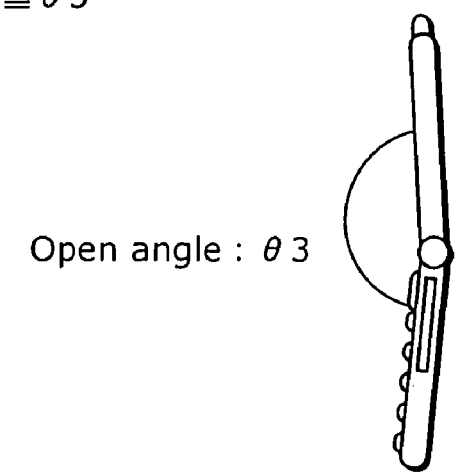
Open angle : $\theta 3$ Swivel-type mobile phone Sliding-type mobile phone

FIG. 20A

| First terminal status 701 | Second terminal status 702 |
|---|---|
| Switch ON | No information |

| First terminal status 701 | Second terminal status 702 |
|---|---|
| Switch ON | Standby |

| First terminal status 701 | Second terminal status 702 |
|---|---|
| Standby | Contactless communication |

| First terminal status 701 | Second terminal status 702 |
|---|---|
| Contactless communication | Standby |

| 701 First terminal status | 702 Second terminal status |
|---|---|
| Switch ON | No information |

| 701 First terminal status | 702 Second terminal status |
|---|---|
| Switch ON | Standby |

| 701 First terminal status | 702 Second terminal status |
|---|---|
| Standby | Contactless communication |

| 701 First terminal status | 702 Second terminal status |
|---|---|
| Contactless communication | Standby |

| 701 First terminal status | 702 Second terminal status |
|---|---|
| Standby | Billing processing |

| Terminal status 900 | User action 901 | Post-action terminal status 902 | SD memory card use possibility 903 | |
|---|---|---|---|---|
| Switch OFF | Turn on switch | Switch ON | No | 910 |
| Switch ON | Null | Standby | No | 911 |
| Standby | Null | Standby | No | 912 |
| Standby | Access data folder | Data access | Yes | 913 |
| Standby | Activate address book application | Accessing address book | No | 914 |
| Standby | Start Web access | Web access | No | 915 |
| Standby | Activate music reproduction application | Music reproduction | Yes | 916 |
| Standby | Activate image capture application | Image capture | Yes | 917 |
| Standby | Activate image recording application | Image recording | Yes | 918 |
| Accessing address book (after activating address book) | Edit address book | Data access | Yes | 918a |
| Accessing mail (after activating mail) | Edit mail | Data access | Yes | 919 |
| Standby | Place in electric field | Contactless communication | No | 920 |
| Contactless communication | Remove from electric field | Standby | No | 921 |
| Standby | Activate billing application | Billing processing | Yes | 923, 924 |

402

PORTABLE TERMINAL

TECHNICAL FIELD

The present invention relates to a mobile terminal to which an external memory can be inserted, and particularly to a mobile terminal for reducing unnecessary consumption of electric power.

BACKGROUND ART

Today, mobile terminals such as mobile phones and personal digital assistants (PDA) are in widespread use. Reasons for the widespread use of the mobile terminals include the fact that they are easy to carry and have a variety of functions.

However, since the mobile terminals have a variety of functions, there are cases where a built-in memory is not sufficient to secure necessary data. Consequently, it has become common that many of the mobile terminals of today are equipped with an external memory in which data is saved.

There are such external memories as SD memory cards, mini SD cards, smart SDs, Memory Sticks, Smart Media, MMC memory cards, CompactFlash® memories, Microdrives, and compact HHDs. In the following description, an SD memory card is used as an example of the external memories.

FIG. 1 is a diagram showing a hardware configuration of a conventional mobile terminal. This mobile terminal 200 includes a ROM 203, a RAM 202, a CPU 201, an SD slot 204, and other functional units 205.

The ROM 203 stores programs. The RAM 202 temporarily stores data which is to be used when a program is executed. The CPU 201 performs various processing such as control processing, in accordance with programs stored in the ROM 203. The SD slot 204 is a slot in which an SD memory card is inserted. The other functional units 205 are, for example, EEPROMS, which are used for implementing other functions.

FIG. 2 is a diagram showing a software configuration of the conventional mobile terminal. The mobile terminal 200 includes, as its functions, an SD slot status detecting unit 304, an electric power supplying unit 302, a recognition processing unit 303, and a controlling unit 301.

The SD slot status detecting unit 304 detects that an SD memory card is inserted. The electric power supplying unit 302 supplies electric power to the SD memory card. The recognition processing unit 303 sends and receives a predetermined command for recognizing the SD memory card. The controlling unit 301 controls the electric power supplying unit 302 and the recognition processing unit 303.

FIG. 3 is a flowchart showing processing in which the conventional mobile terminal recognizes the SD memory card. First, when detecting that a card is inserted into the SD slot (Y in S601), the SD slot status detecting unit 304 notifies the controlling unit 301 of the detection. The controlling unit 301 instructs the electric power supplying unit 302 to start supplying electric power to the SD memory card (S602), and instructs the recognition processing unit 303 to start an initialization sequence processing (S603). The recognition processing unit 303 issues a recognition command ACMD 41 within a predetermined time period from when the instruction is received. As a result, an initialization processing (S604) starts, and when this initialization processing completes, the recognition processing of the SD memory card completes.

FIG. 4 is a diagram showing a relationship between a supply voltage and recognition processing time with respect to a conventional SD memory card. As described above, conventionally, as soon as the SD memory card is inserted into the SD slot, an electric power supply to the SD memory card starts. When the power-up time, which goes on until the supply voltage reaches the minimum supply voltage, elapses, the ramp-up time, which goes on until the supply voltage reaches the bus supply voltage, starts. When the ramp-up time elapses (or when the initialization sequence processing completes), the ACMD 41 is sent to the SD memory card, and the initialization processing starts. When the initialization processing completes, the mobile terminal recognizes that the inserted card is the SD memory card. From this time on, it is possible to access the SD memory card.

As described above, it is common that the electric power supply to the SD memory card starts when the SD memory card is inserted into the mobile terminal. It is also common that once the electric power supply starts, the electric power supply continues in an electric power saving mode even when the SD memory card is not in use.

SUMMARY OF THE INVENTION

Problems that Invention is to Solve

However, for such mobile terminals as mobile phones and PDAs, consumption of electric power needs to be reduced to a minimum. This is surely because consumption of unnecessary electric power results in a high frequency of charging and replacing a battery, and could also cause a situation where the mobile terminal cannot be used when the electric power is actually needed.

Therefore, the continued supply of electric power to an unused SD memory card, as in the conventional case, is not preferable. For example, even when the SD memory card is inserted to the mobile terminal which is in a standby mode, it does not necessarily mean that the SD memory card is used immediately. However, conventionally, the electric power supply to the SD memory card starts immediately, thus resulting in consumption of unnecessary electric power.

The present invention is to solve the above mentioned problem, and aims at providing a mobile terminal which can reduce unnecessary consumption of electric power.

Means to Solve the Problems

In order to achieve the above described object, the mobile terminal of the present invention is a mobile terminal which includes a terminal status detecting unit which detects a first terminal status and a second terminal status, the first terminal status being a status of the mobile terminal before a change in the mobile terminal takes place, and the second terminal status being a status of the mobile terminal after the change in the mobile terminal takes place; a condition storing unit which stores a condition for starting an electric power supply to the external memory; a judging unit which judges, when the first terminal status and the second terminal status are detected by the terminal status detecting unit, whether or not the change in the status of the mobile terminal meets the condition; and an electric power supplying unit which starts the electric power supply to the external memory when the change in the status of the mobile terminal is judged by the judging unit as meeting the condition. As a result, the electric power supply to the external memory does not start until the change in the status of the mobile terminal meets a predetermined condition, and thus, unnecessary consumption of electric power can be reduced.

Here, the judging unit may judge whether or not a change in a status of hardware of the mobile terminal meets the condition. As a result, the electric power supply to the external memory does not start until there is a change in the status of hardware of the mobile terminal.

More specifically, in the case where the mobile terminal is a folding-type mobile terminal and an open angle of the mobile terminal reaches a predetermined angle or above, the judging unit may judge the change in the status of the hardware as meeting the condition. As a result, the electric power supply to the external memory does not start until the open angle of the folding-type mobile terminal reaches the predetermined angle or above.

Further, in the case where the mobile terminal is a swivel-type mobile terminal and an open angle of the mobile terminal reaches a predetermined angle or above, the judging unit may judge the change in the status of the hardware as meeting the condition. As a result, the electric power supply to the external memory does not start until the open angle of the swivel-type mobile terminal reaches the predetermined angle or above.

Furthermore, in the case where the mobile terminal is a sliding-type mobile terminal and a sliding distance of the mobile terminal reaches a predetermined distance or above, the judging unit may judge the change in the status of the hardware as meeting the condition. As a result, the electric power supply to the external memory does not start until the sliding distance of the sliding-type mobile terminal reaches the predetermined distance or above.

Alternatively, the judging unit may judge whether or not a change in a status of an application program installed in the mobile terminal meets the condition. As a result, the electric power supply to the external memory does not start until there is a change in the status of the application program installed in the mobile terminal.

More specifically, in the case where a music reproduction application program, as the application program, is activated, the judging unit may judge the change in the status of the application as meeting the condition, the music reproduction application program having a function to reproduce music. As a result, the electric power supply to the external memory does not start until the music reproduction application program is activated.

Further, in the case where an image reproduction application program, as the application program, is activated, the judging unit may judge the change in the status of the application as meeting the condition, the image reproduction application program having a function to reproduce an image. As a result, the electric power supply to the external memory does not start until the image reproduction application program is activated.

Furthermore, in the case where the mobile terminal is a television equipped mobile terminal and an image recording application program, as the application program, is activated, the judging unit may judge the change in the status of the application as meeting the condition, the image recording application program having a function to record an image received by the mobile terminal. As a result, the electric power supply to the external memory does not start until the image recording application program is activated.

Further, in the case where an address book application program, as the application program, is activated, the judging unit may judge the change in the status of the application as meeting the condition, the address book application program having a function to edit data in an address book. As a result, the electric power supply to the external memory does not start until the address book application program is activated.

Furthermore, in the case where a billing application program, as the application program, is activated, the judging unit may judge the change in the status of the application as meeting the condition, the billing application program having a function to perform billing-related processing. As a result, the electric power supply to the external memory does not start until the billing application program is activated.

Further, in the case where the application program starts data access, the judging unit may judge the change in the status of the application as meeting the condition. As a result, the electric power supply to the external memory does not start until the application program starts data access.

Alternatively, the judging unit may judge whether or not a change in a status in contactless communication carried out by the external memory meets the condition. As a result, the electric power supply to the external memory does not start until there is a change in the status in contactless communication carried out by the external memory.

More specifically, in the case where the external memory finishes the contactless communication, the judging unit may judge the change in the status in the contactless communication as meeting the condition. As a result, the electric power supply to the external memory does not start until the external memory finishes the contactless communication.

Further, in the case where a billing application program is activated, the judging unit may judge the change in the status in the contactless communication as meeting the condition, the billing application program having a function to perform billing-related processing. As a result, even when the external memory finishes the contactless communication, the electric power supply to the external memory does not start until the billing application program is activated.

Note that the present invention may be embodied not only as a mobile terminal described above, but also as an electric power supplying method in which the characteristic constituent units of such mobile terminal serve as steps. The present invention may also be embodied as a program which causes a computer to execute such steps. Needless to say, such a program may be distributed on a recording medium such as a CD-ROM or on a transmission medium such as the Internet.

Further, each function block shown in the structural diagram (FIG. 6) may be typically embodied as an LSI, that is, an integrated circuit. The function blocks may be individually incorporated into a chip or may be incorporated into a chip in such way that they are partially or fully included. Here, the integrated circuit is called "LSI", however, there are cases where it is called "IC", "system LSI", "super LSI" and "ultra LSI", depending on the degree of integration.

Furthermore, the technique of embodying the function blocks as an integrated circuit is not limited to such LSI, and may be embodied as a private circuit or a conventional processor. A Field Programmable Gate Array (FPGA) which can store programs after the manufacturing of an LSI, or a reconfigurable processor which can reconfigure, after the manufacturing of an LSI, connection and setting of a circuit cell included in the LSI may be used instead.

When a progress in semiconductor technology or another technology deriving from the semiconductor technology leads to an introduction of a new technology for the incorporation of components into an integrated circuit which replaces the LSI, the above mentioned function blocks equipped in the mobile terminal may surely be integrated using such new technology. There is a possibility for an application of biotechnology and the like.

Effects of the Invention

As described above, according to the mobile terminal of the present invention, the electric power supply to the external memory does not start until a change in the status of the mobile terminal meets a predetermined condition. Therefore, unnecessary consumption of electric power can be reduced. As a result, the frequency of charging and replacing the battery can be reduced, and thus it is possible to relieve a user's inconvenience.

Further, the electric power supply to the external memory does not start until there is a change in the status of a specific application program such as a music reproduction application program and a billing application program, among application programs included in the mobile terminal. In other words, the electric power supply to the external memory does not start when there is a change in the status of an application program which does not use the external memory. Therefore, unnecessary consumption of electric power can be reduced.

Furthermore, the electric power supply to the external memory does not start until data access starts in an application program. Therefore, the electric power supply to the external memory does not start even when an application program is activated, unless there is a need to make access to the external memory. Consequently, unnecessary consumption of electric power can be reduced.

In addition, the electric power supply to the external memory does not start until there is a change in the status of hardware of the mobile terminal. When a mechanism which judges a change in the status of hardware is implemented with hardware, there is an effect of reducing a load on the software.

Further, in the case where the external memory is a memory card which is compatible with contactless communication, the electric power supply to the external memory starts when contactless communication finishes. In other words, the electric power supply to the external memory does not start while contactless communication, which does not require the electric power supply, is in progress. Therefore, unnecessary consumption of electric power can be reduced. In addition to this effect, there is also an effect that the system can be simplified, because the system only needs to judge whether or not contactless communication is in progress.

Further, in the case where the external memory is the memory card which is compatible with contactless communication, the system may be set in such way that the electric power supply to the external memory does not start until billing processing application program is activated. As a result, even when the contactless communication finishes, the electric power supply does not start until there is a need to make access to the external memory card. Consequently, unnecessary consumption of electric power can be reduced.

BRIEF DESCRIPTION OF DRAWINGS

FIG. 8 is a diagram showing contents of a condition managing table of the first embodiment.

FIGS. 11A, 11B and 11C are diagrams showing contents of a terminal status managing table of a second embodiment.

FIGS. 15A, 15B, 15C and 15D are diagrams showing a relationship between a folding-type mobile terminal and a condition for starting an electric power supply.

FIGS. 20A, 20B, 20C and 20D are diagrams showing contents of a terminal status managing table of an eighth embodiment.

FIGS. 21A, 21B, 21C, 21D and 21E are diagrams showing contents of a terminal status managing table of a ninth embodiment.

FIG. 22 is a diagram showing contents of a condition managing table of the ninth embodiment.

NUMERICAL REFERENCES

Figure 1:
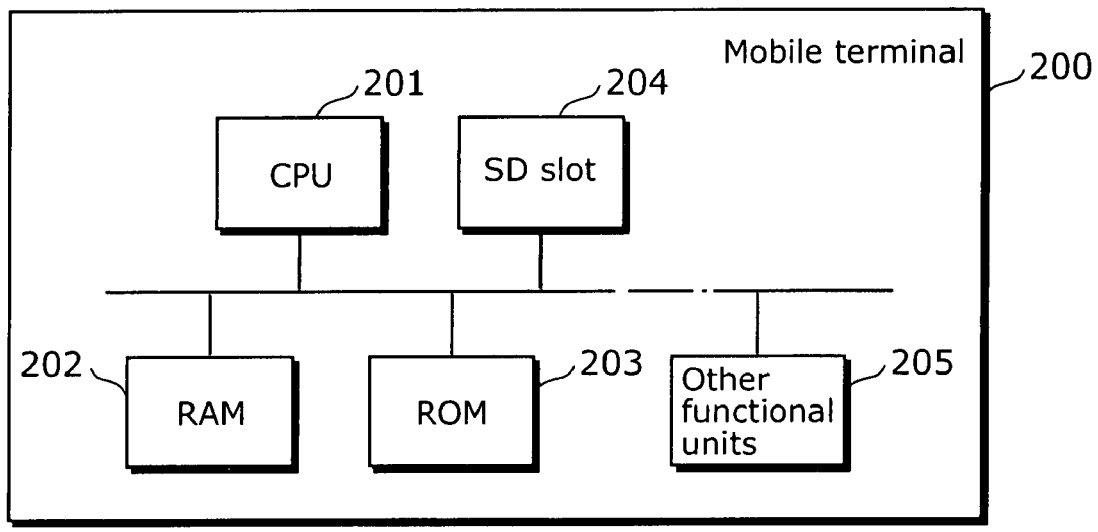
FIG. 1 is a diagram showing a hardware configuration of a conventional mobile terminal.
Figure 2:
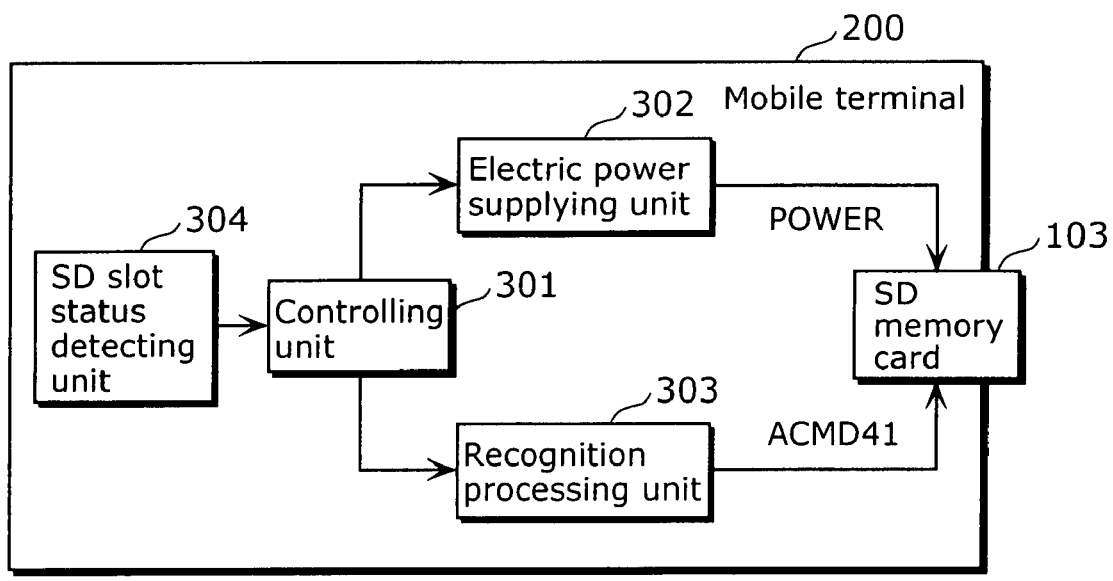
FIG. 2 is a diagram showing a software configuration of the conventional mobile terminal.
Figure 3:
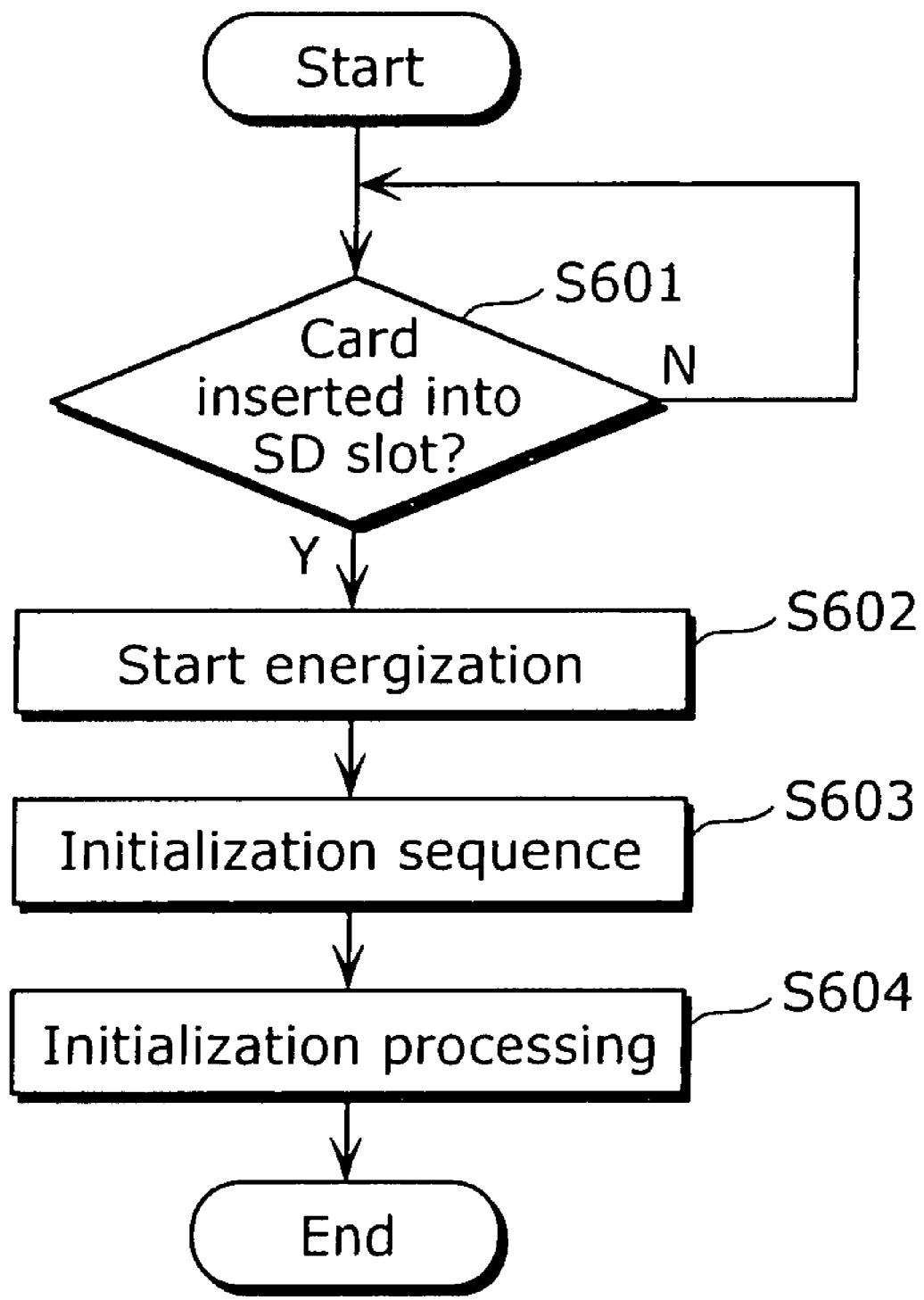
FIG. 3 is a flowchart showing processing in which the conventional mobile terminal recognizes an SD memory card.
Figure 4:
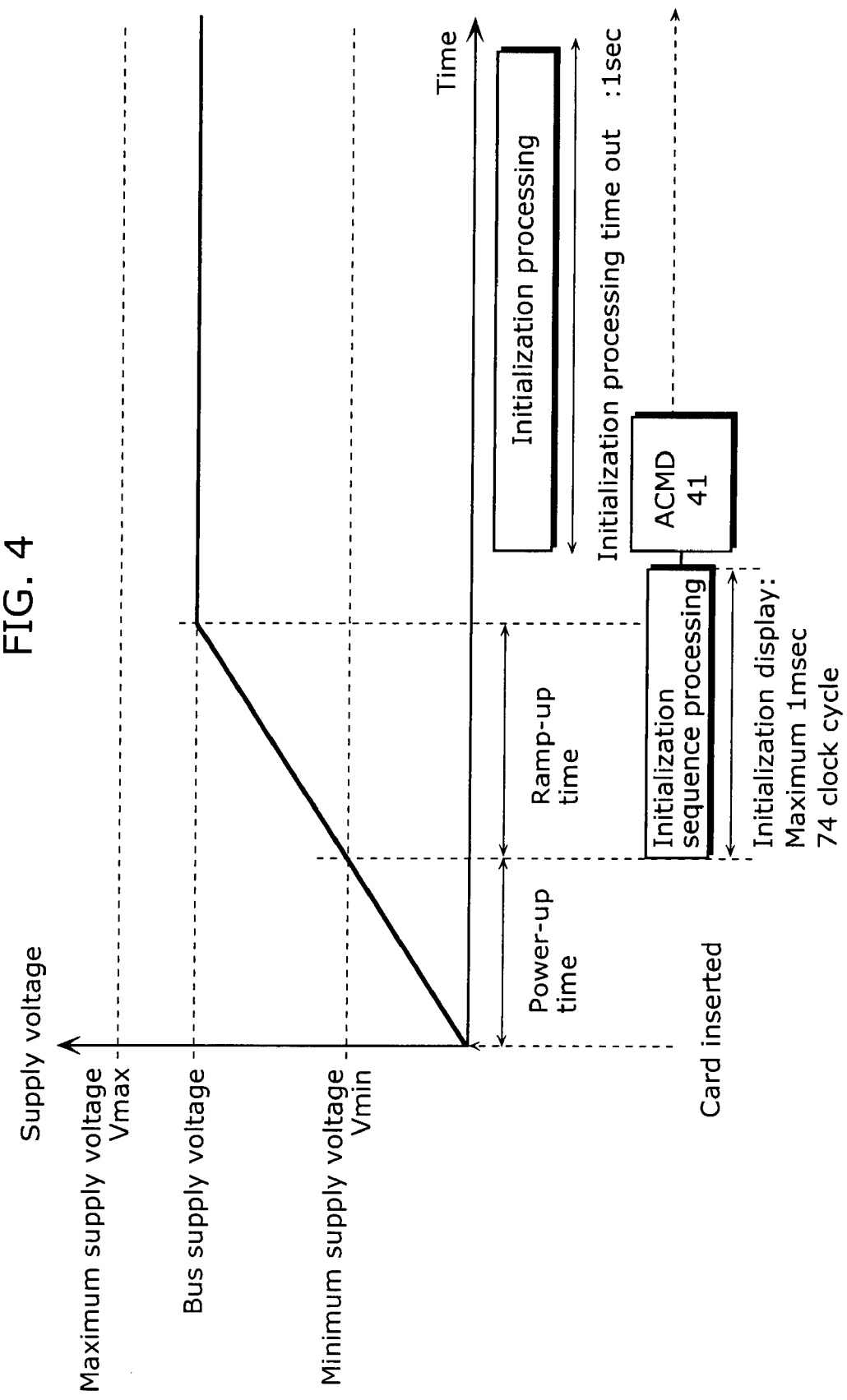
FIG. 4 is a diagram showing a relationship between a supply voltage and recognition processing time with respect to a conventional SD memory card.

103 SD memory card
200 Mobile terminal
301 Controlling unit
302 Electric power supplying unit
303 Recognition processing unit
304 SD slot status detecting unit
400 Terminal status detecting unit
401 Terminal status managing table
402 Condition managing table
403 Judging unit

DETAILED DESCRIPTION OF THE INVENTION

The following describes in detail embodiments of the present invention with reference to the drawings.

First Embodiment

Figure 5:
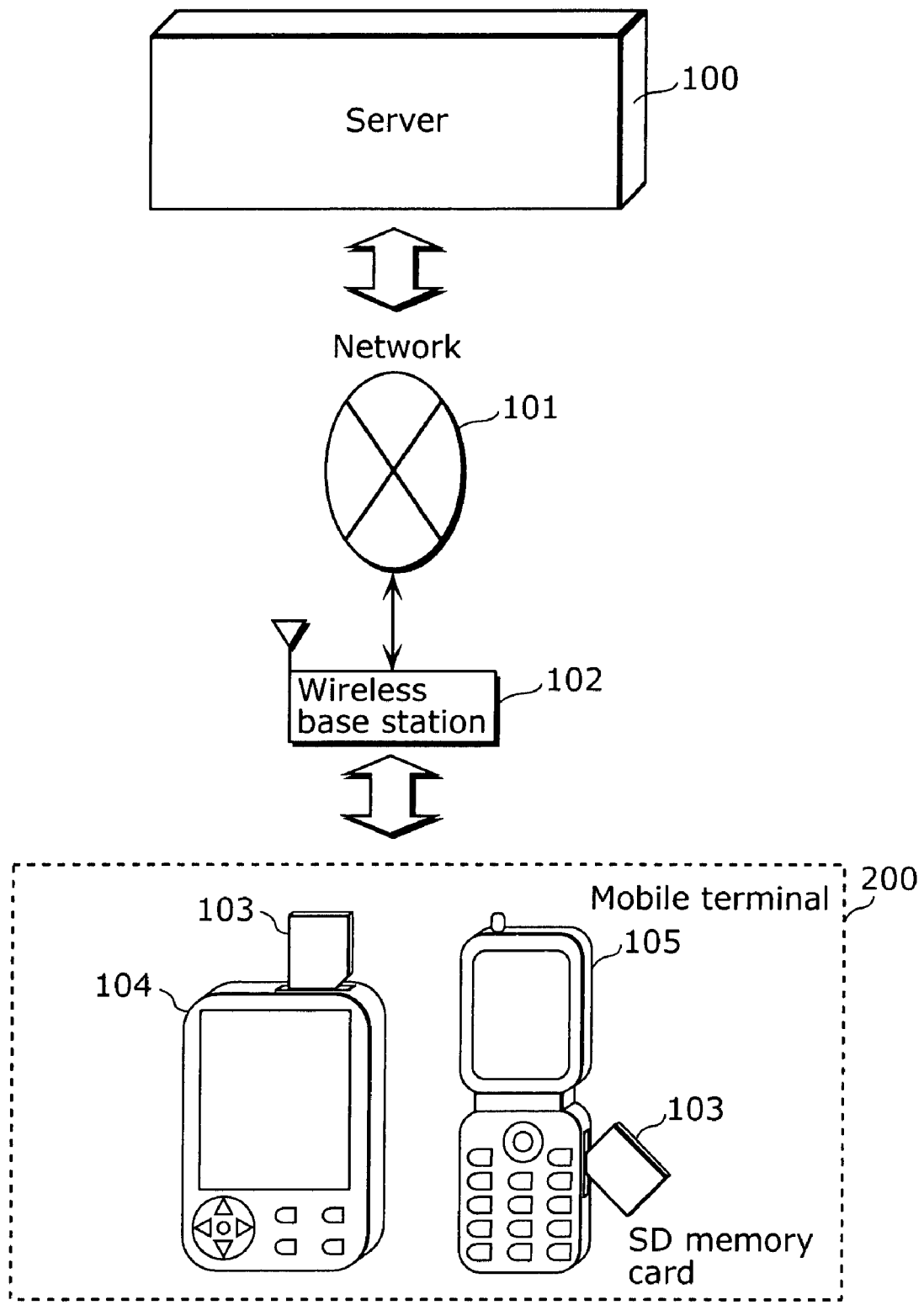
FIG. 5 is a diagram showing a usage environment of a mobile terminal of a first embodiment.

FIG. 5 is a diagram showing a usage environment of a mobile terminal of a first embodiment.

This usage environment includes a server 100, a network 101, a wireless base station 102, and a mobile terminal 200. The server 100 provides music data, application data and the like to the mobile terminal 200 via the network 101 and the wireless base station 102.

The wireless base station 102 is equipment on a rooftop of a building or on a power pole, and inputs and outputs data via the air. The wireless base station 102 is connected to the server 100 via the network 101. Via the wireless base station 102, the mobile terminal 200 can receive services of the server 100.

Examples of the mobile terminal 200 include a mobile phone 105 and a PDA 104 which receive the services of the server 100 via the network 101 and the wireless base station 102. Further, the mobile terminal 200 is a device which accesses an SD memory card 103. More specifically, browser software and the like is preinstalled in the mobile terminal 200, and the user can access data in the SD memory card 103 via a user interface of the browser software.

A hardware configuration of the mobile terminal in the first embodiment is the same as the hardware configuration of the conventional mobile terminal (FIG. 1). Thus, its detailed description is omitted.

Figure 6:
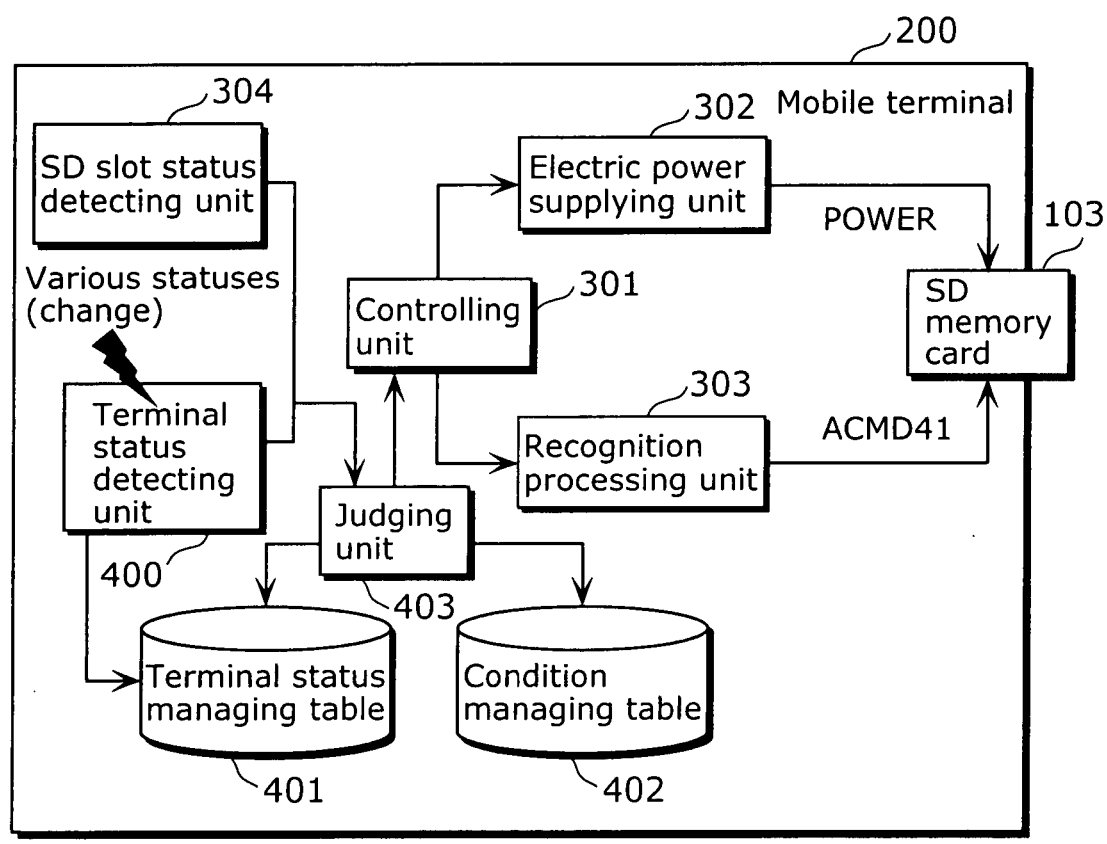
FIG. 6 is a diagram showing a software configuration of the mobile terminal of the first embodiment.

FIG. 6 is a diagram showing a software configuration of the mobile terminal of the first embodiment. The mobile terminal of the first embodiment is the same as the conventional mobile terminal in that the mobile terminal of the first embodiment includes the SD slot status detecting unit 304, the electric power supplying unit 302, the recognition processing unit 303, and the controlling unit 301. However, the mobile terminal of the first embodiment is different from the conventional mobile terminal in that the mobile terminal of the first embodiment includes a terminal status detecting unit 400, a terminal status managing table 401, a condition managing table 402, and a judging unit 403.

The terminal status detecting unit 400 detects a status of the mobile terminal (hereinafter referred to as "terminal status"). For example, in the case where there is no action with the mobile terminal even after a fixed period of time, a status, "standby", is detected, and in the case where an application program (hereinafter simply referred to as "application") is activated, a status such as "application activated" is detected. The terminal status managing table 401 is a table which manages a terminal status detected by the terminal status detecting unit 400. The condition managing table 402 is a table which manages a condition for starting an electric power supply to the SD memory card, and is an example of a condition storing unit according to the present invention. The judging unit 403 judges whether or not a change in the status of the mobile terminal meets the condition managed by the condition managing table 402, and notifies the controlling unit 301 of the judging result.

Figure 7A:
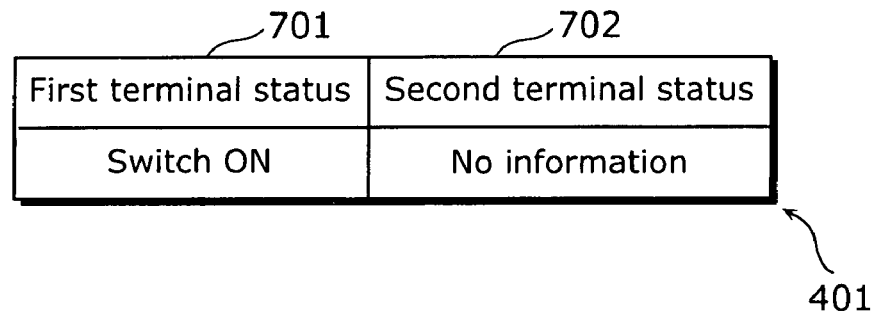
FIGS. 7A, 7B and 7C are diagrams showing contents of a terminal status managing table of the first embodiment.
Figure 7B:
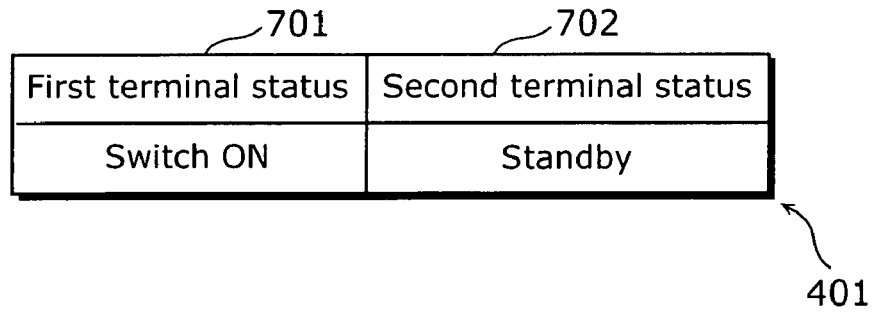
Figure 7C:
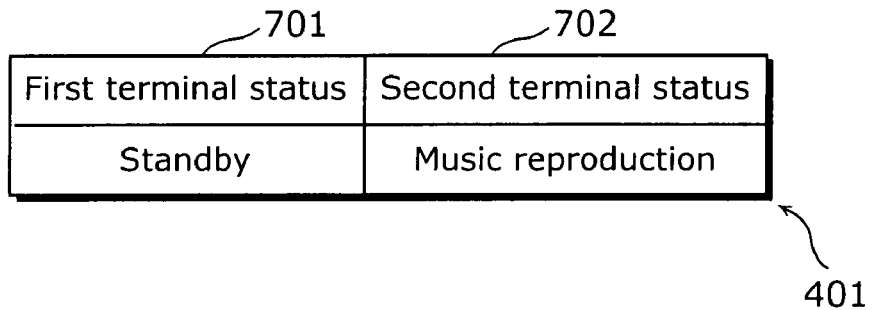

FIGS. 7A, 7B and 7C are diagrams showing contents of the terminal status managing table 401. As shown in these figures, the terminal status managing table 401 manages a first terminal status and a second terminal status. The first terminal status is a terminal status before a change takes place (a terminal status which is just before the second terminal status), and is stored in a region 701 of the terminal status managing table 401. The second terminal status is a terminal status after the change takes place (a current terminal status), and is stored in a region 702 of the terminal status managing table 401.

FIG. 8 is a diagram showing contents of the condition managing table 402. As shown in the figure, the condition managing table 402 manages a terminal status 900, a user action 901, a post-action terminal status 902, and an SD memory card use possibility 903. The terminal status 900 is a status of the mobile terminal. The user action 901 is an action performed by the user when the mobile terminal is in the terminal status 900. The post-action terminal status 902 is a terminal status after the user action 901 is performed. The SD memory card use possibility 903 is a possibility for the SD memory card to be used when the mobile terminal is in the post-action terminal status 902.

Like this, a condition for starting the electric power supply to the SD memory card is predetermined in the condition managing table 402. More specifically, in the case where the electric power supply to the SD memory card should start, an item of "yes" is set as the SD memory card use possibility 903, and conversely, in the case where the electric power supply to the SD memory card should not start, an item of "no" is set as the SD memory card use possibility 903. Such setting information can be downloaded from the Internet, and can be updated when needed.

Figure 9:
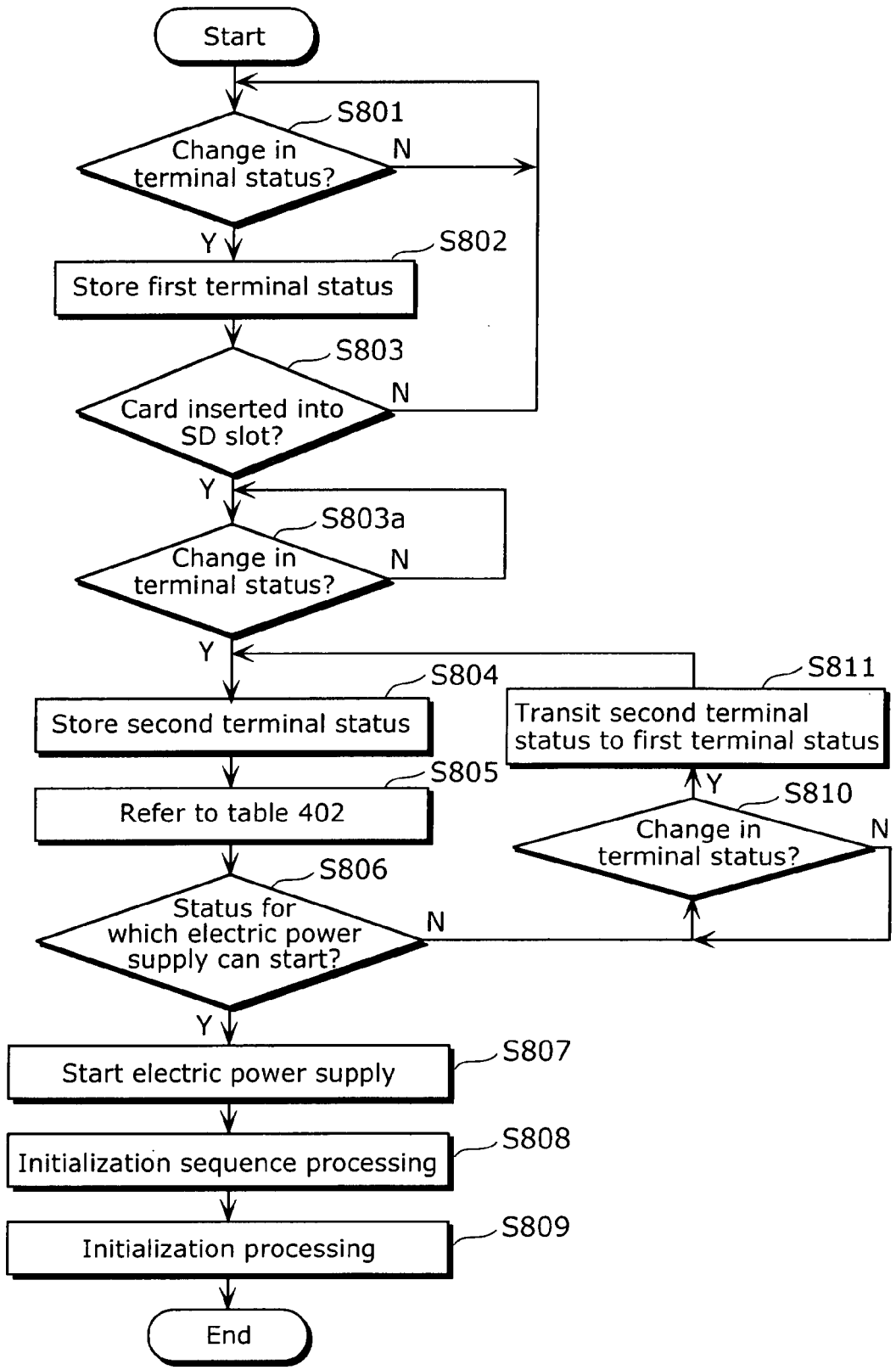
FIG. 9 is a flowchart showing processing in which the mobile terminal of the first embodiment recognizes an SD memory card.

FIG. 9 is a flowchart showing processing in which the mobile terminal of the first embodiment recognizes the SD memory card. With reference to FIG. 9 and FIG. 6, the following describes operations of the mobile terminal of the first embodiment.

Firstly, when detecting a change in the terminal status (Y in S801), the terminal status detecting unit 400 stores, in the region 701 of the terminal status managing table 401, the detected terminal status as the first terminal status (S802). Further, when detecting that the card is inserted into the SD slot (Y in S803), the SD slot status detecting unit 304 notifies the judging unit 403 of the detection.

Next, when detecting another change in the terminal status (Y in S803a), the terminal status detecting unit 400 stores, in the region 702 of the terminal status managing table 401, the detected terminal status as the second terminal status (S804).

Then, the judging unit 403 reads out the first terminal status and the second terminal status from the terminal status managing table 401. Based on these terminal statuses, the judging unit 403 then refers to the condition managing table 402 (S805), and judges whether or not the mobile terminal is in a status for which the electric power supply should start (S806).

With this, when judging that the mobile terminal is in a status for which the electric power supply should start (Y in S806), the judging unit 403 notifies the controlling unit 301 of the judging result. The controlling unit 301 instructs the electric power supplying unit 302 to start supplying electric power to the SD memory card (S807), and instructs the recognition processing unit 303 to start the initialization sequence processing (S808). The recognition processing unit 303 issues the recognition command ACMD 41 within a predetermined time period from when the instruction is received. As a result, the initialization processing (S809) is performed, and when this initialization processing completes, the recognition processing of the SD memory card completes.

On the other hand, when judging that the mobile terminal is in a status for which the electric power supply should not start (N in S806), the judging unit 403 enters a standby status, and stays in the standby status until there is a change in the terminal status. When detecting a change in the terminal status (Y of S801), the terminal status detecting unit 400 updates the terminal status managing table 401. More specifically, the terminal status detecting unit 400 transits the second terminal status, stored in the region 702, to the first terminal status for storage in the region 701 (S811). Further, the terminal status detecting unit 400 stores a newly detected terminal status in the region 702 as the second terminal status (S804).

From here on, the operations described above are repeated (S805-S806).

Next, more concrete operations are described as an example. Operations of the mobile terminal described here are operations which are performed when the SD memory card is inserted, after the mobile terminal is switched on, and then a music reproduction application is activated. The music reproduction application is an application which has a function to reproduce music.

First, when detecting that the mobile terminal is switched on (Y in S801), the terminal status detecting unit 400, as shown in FIG. 7A, stores the detected terminal status, "switched on", in the region 701 of the terminal status managing table 401 as the first terminal status (S802). At this point of time, there is no second terminal status. Therefore, information indicating, for example, NULL, meaning "no information", is stored in the region 702 of the terminal status managing table 401.

After that, when the SD memory card is inserted into the SD slot, the SD slot status detecting unit 304 detects the insertion of the memory card (S803), and notifies the judging unit 403 of the detection.

Next, when detecting that there is no change in the terminal status even after a fixed period of time (Y in S803a), the terminal status detecting unit 400, as shown in FIG. 7B, stores the detected terminal status, "standby", in the region 702 of the terminal status managing table 401 as the second terminal status (S804).

Then, the judging unit 403 reads out, from the terminal status managing table 401, the first terminal status, "switched on", and the second terminal status, "standby". Based on these pieces of terminal information, the judging unit 403 then refers to the condition managing table 402 (S805), and judges whether or not the mobile terminal is in a status for which the electric power supply should start (S806).

More specifically, since the first terminal status is "switched on", and the second terminal status is "standby", the judging unit 403 refers to a record 912 in which, as shown in FIG. 8, the terminal status 900 is "switched on" and the post-action terminal status 902 is "standby" (S805). In this record 912, information which indicates "no" is stored as the SD memory card use possibility 903. Therefore, the judging unit 403 judges that the mobile terminal is in a status for which the electric power supply should not start (N in S806). In such case, the judging unit 403 enters the standby status, and thus the electric power supply to the SD memory card does not start.

Next, when detecting that the music reproduction application is activated (Y in S810), the terminal status detecting unit 400 updates the terminal status managing table 401 as shown in FIG. 7C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "music reproduction", in the region 702 as the second terminal status (S804).

Then, the judging unit 403 reads out, from the terminal status managing table 401, the first terminal status, "standby", and the second terminal status, "music reproduction". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "music reproduction", the judging unit 403 refers to a record 917 in which, as shown in FIG. 8, the terminal status 900 is "standby", and the post-action terminal status 902 is "music reproduction" (S805). In this record 917, information which indicates "yes" is stored as the SD memory card use possibility 903. Therefore, the judging unit 403 judges that the mobile terminal is in a status for which the electric power supply should start (Y in S806).

In such case, the controlling unit 301 instructs the electric power supplying unit 302 to start supplying electric power to the SD memory card (S807), and instructs the recognition processing unit 303 to start the initialization sequence processing (S808). The recognition processing unit 303 issues the recognition command ACMD 41 within a predetermined time period from when the instruction is received. As a result, the initialization processing (S809) is performed, and when this initialization processing completes, the recognition processing of the SD memory card completes.

Figure 10:
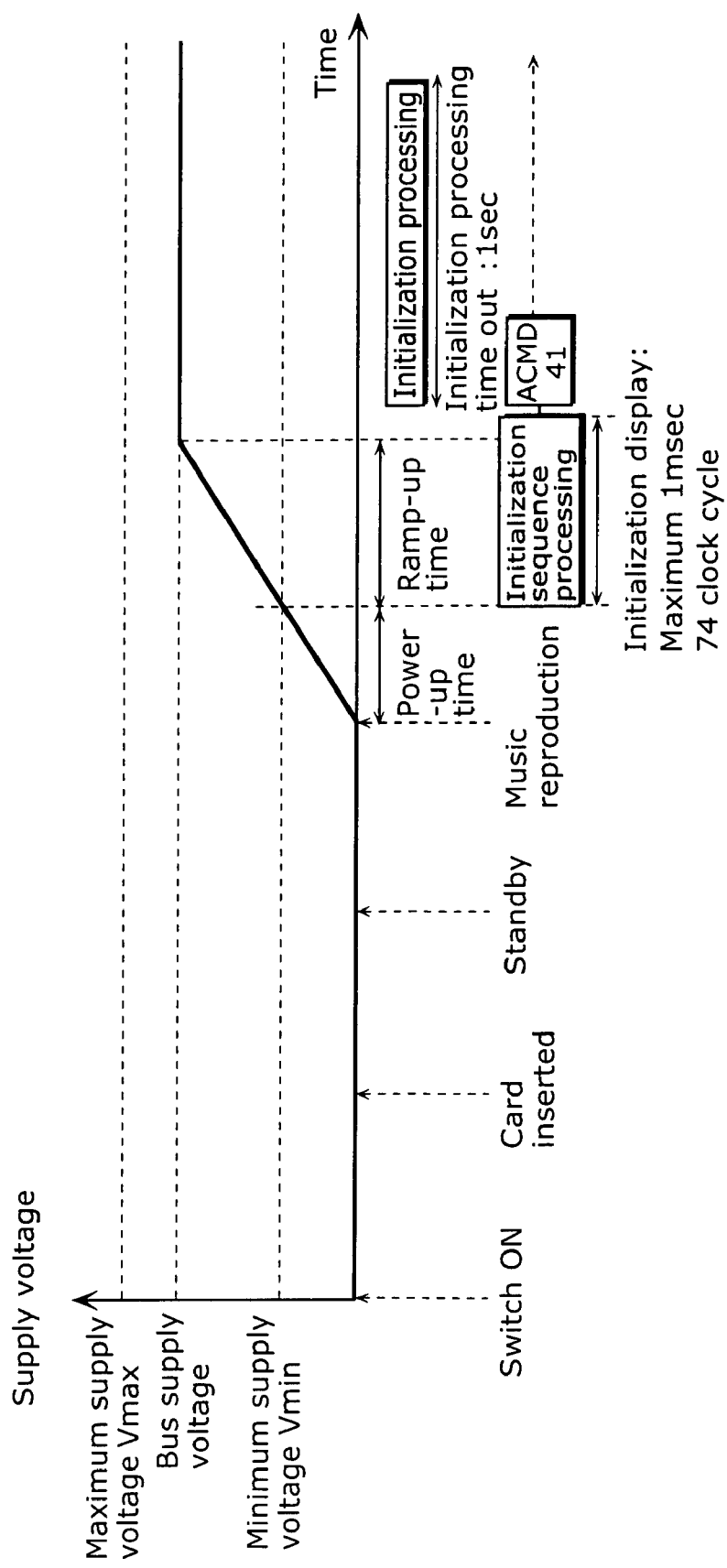
FIG. 10 is a diagram showing timing of an electric power supply according to the first embodiment.

FIG. 10 is a diagram showing timing of the electric power supply according to the first embodiment. As shown in this figure, according to the first embodiment, the electric power supply to the SD memory card starts when the SD memory card is in the SD slot, and the status of the mobile terminal changes from "standby" to "music reproduction".

As described above, according to the first embodiment, the electric power supply to the SD memory card starts when the music reproduction application is activated. In other words, the electric power supply to the SD memory card does not start until then. Therefore, unnecessary consumption of electric power can be reduced. As a result, the frequency of charging and replacing the battery can be reduced, and thus it is possible to relieve the user's inconvenience.

Furthermore, the electric power supply to the SD memory card does not start until the music reproduction application, which is one of the applications installed in the mobile terminal, is activated. In other words, the electric power supply to the SD memory card does not start when an application in which the SD memory card is not used is activated.

Note that after the recognition processing of the SD memory card completes, the SD memory card may, as in the conventional case, enter an electric power saving mode or finish the electric power supply. Needless to say, the SD memory card enters the electric power saving mode or finish the electric power supply only when the SD memory card is not used even after a fixed period of time.

In addition, although, here, the electric power supply to the SD memory card starts when the music reproduction application is activated, the present invention is not limited to this. In other words, the electric power supply to the SD memory card may start when an image reproduction application is activated. Apart from the difference that the object for reproduction is an image rather than music, the operations of the mobile terminal performed when the image reproduction application is activated are the same as the operations of the mobile terminal which are performed when the music reproduction application is activated.

Second Embodiment

Although in the first embodiment, the electric power supply to the SD memory card starts when the music reproduction application or the image reproduction application is activated, the present invention is not limited to this. In other words, the electric power supply to the SD memory card may start when an image capture application is activated. The image capture application is an application which has a function to capture an image.

The following describes operations of the mobile terminal which are performed when the image capture application is activated. Since the basic operations are the same as the operations described in the first embodiment, the following describes operations in Step S810 and the subsequent steps which are shown in FIG. 9. Further, although FIGS. 11A, 11B and 11C are diagrams showing contents of the terminal status managing table 401 of the second embodiment, the description of the transit from FIG. 11A to FIG. 11B is omitted, because it is the same as the transit described in the first embodiment.

When detecting that the image capture application is activated (Y in S810), the terminal status detecting unit 400 updates the terminal status managing table 401 as shown in FIG. 11C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "image capture", in the region 702 as the second terminal status (S804).

Here, the judging unit 403 reads out, from the terminal status managing table 401, the first terminal status, "standby", and the second terminal status, "image capture". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "image capture", the judging unit 403 refers to a record 918 in which, as shown in FIG. 8, the terminal status 900 is "standby", and the post-action terminal status 902 is "image capture" (S805). In this record 918, information which indicates "yes" is stored as the SD memory card use possibility 903. Therefore, the judging unit 403 judges that the mobile terminal is in a status for which the electric power supply should start (Y in S806). As a result, the electric power supply to the SD memory card starts, however, the description of this operation is omitted because it is the same as the operation described in the first embodiment.

As described above, according to the second embodiment, the electric power supply to the SD memory card starts when the image capture application is activated. In other words, the electric power supply to the SD memory card does not start until then. Therefore, unnecessary consumption of electric power can be reduced.

Third Embodiment

Although in the second embodiment, the electric power supply to the SD memory card starts when the image capture application is activated, the present invention is not limited to this. In other words, the electric power supply to the SD memory card may start when an image recording application is activated.

For example, the mobile terminal 200 is assumed to be a mobile terminal having a television tuner (hereinafter referred to as "television equipped mobile terminal"). In such case, there is an occasion where an image of a television program received by the television tuner is recorded in the SD memory card. Therefore, the electric power supply to the SD memory card may start when the image recording application is activated.

Figure 12A:
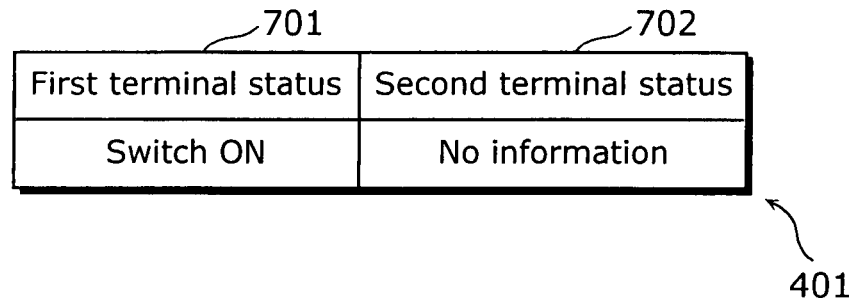
FIGS. 12A, 12B and 12C are diagrams showing contents of a terminal status managing table of a third embodiment.
Figure 12B:
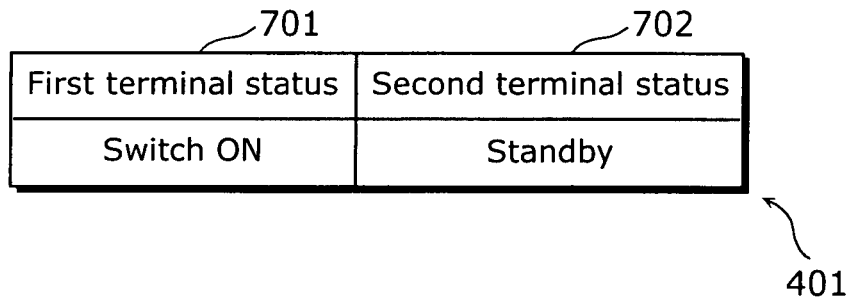

The following describes operations of the mobile terminal which are performed when the image recording application is activated. Since the basic operations are the same as the operations described in the first embodiment, the following describes operations in Step S810 and the subsequent steps which are shown in FIG. 9. Further, although FIGS. 12A, 12B and 12C are diagrams showing contents of the terminal status managing table 401 of the third embodiment, the description of the transit from FIG. 12A to FIG. 12B is omitted, because it is the same as the transit described in the first embodiment.

Figure 12C:
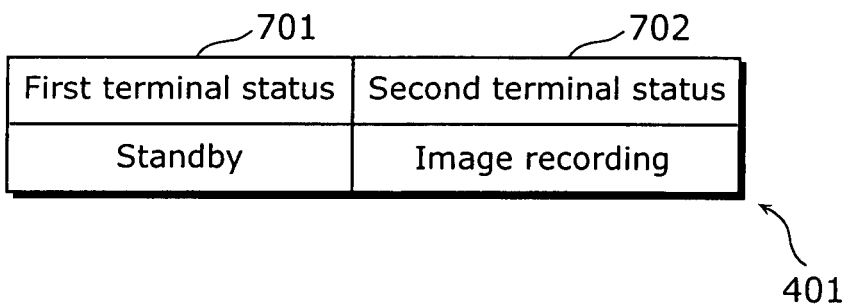

When detecting that the image recording application is activated (Y in S810), the terminal status detecting unit 400 updates the terminal status managing table 401 as shown in FIG. 12C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "image recording", in the region 702 as the second terminal status (S804).

Then, the judging unit 403 reads out, from the terminal status managing table 401, the first terminal status, "standby", and the second terminal status, "image recording". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "image recording", the judging unit 403 refers to a record 918a in which, as shown in FIG. 8, the terminal status 900 is "standby", and the post-action terminal status 902 is "image recording" (S805). In this record 918a, information which indicates "yes" is stored as the SD memory card use possibility 903. Therefore, the judging unit 403 judges that the mobile terminal is in a status for which the electric power supply should start (Y in S806). As a result, the electric power supply to the SD memory card starts, however, the description of this operation is omitted because it is the same as the operation described in the first embodiment.

As described above, according to the third embodiment, the electric power supply to the SD memory card starts when the image recording application is activated. In other words, the electric power supply to the SD memory card does not start until then. Therefore, unnecessary consumption of electric power can be reduced.

Fourth Embodiment

Although in the first through third embodiments, the electric power supply to the SD memory card starts when an application is activated, the present invention is not limited to this. In other words, the electric power supply to the SD memory card may start when an application starts data access.

The following describes operations of the mobile terminal which are performed when an address book application is activated, particularly to operations performed when an action to edit data in an address book is performed. The address book application is an application which has a function to edit data in an address book.

Figure 13A:
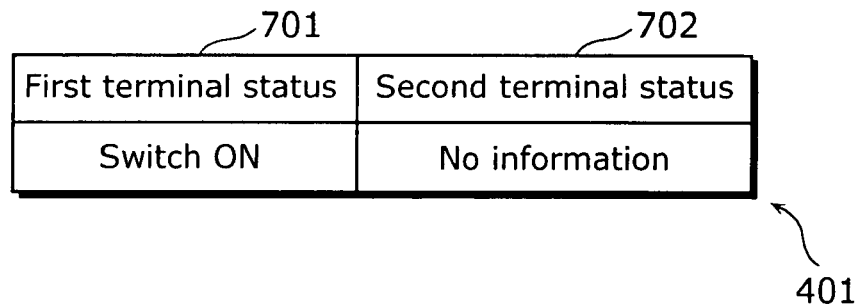
FIGS. 13A, 13B, 13C and 13D are diagrams showing contents of a terminal status managing table of a fourth embodiment.
Figure 13B:
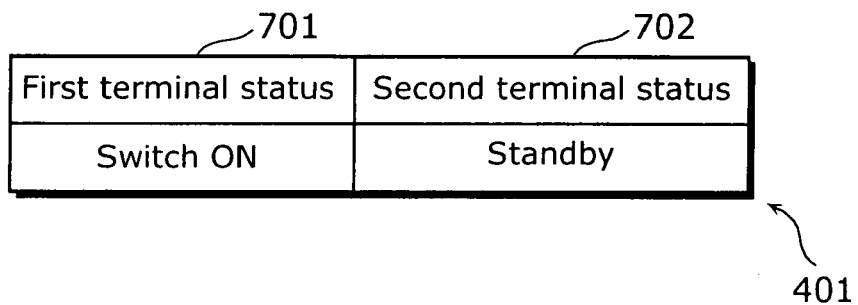

Since the basic operations are the same as the operations described in the first embodiment, the following describes operations in Step S810 and the subsequent steps which are shown in FIG. 9. Further, although FIGS. 13A, 13B, 13C and 13D are diagrams showing contents of the terminal status managing table 401 in the fourth embodiment, the description of the transit from FIG. 13A to FIG. 13B is omitted, because it is the same as the transit described in the first embodiment.

Figure 13C:
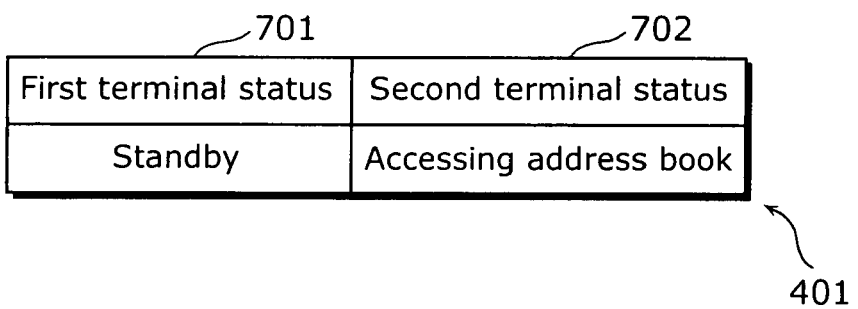

When detecting that the address book application is activated (Y in S810), the terminal status detecting unit 400 updates the terminal status managing table 401 as shown in FIG. 13C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "accessing address book", in the region 702 as the second terminal status (S804).

Then, the judging unit 403 reads out, from the terminal status managing table 401, the first terminal status, "standby", and the second terminal status, "accessing address book". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "accessing address book", the judging unit 403 refers to a record 915 in which, as shown in FIG. 8, the terminal status 900 is "standby", and the post-action terminal status 902 is "accessing address book" (S805). In this record 915, information which indicates "no" is stored as the SD memory card use possibility 903. Therefore, the judging unit 403 judges that the mobile terminal is in a status for which the electric power supply should not start (N in S806). In such case, the judging unit 403 enters the standby status, and thus the electric power supply to the SD memory card does not start.

Figure 13D:
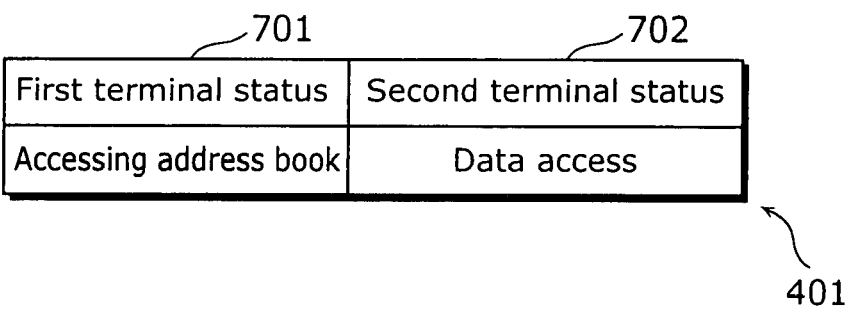

Next, when detecting that an action to edit data in the address book is performed (Y in S810), the terminal status detecting unit 400 updates the terminal status managing table 401 as shown in FIG. 13D. More specifically, the terminal status detecting unit 400 transits the second terminal status, "accessing address book", stored in the region 702, to the first terminal status for storage in the region 701 (S811). Further, the terminal status detecting unit 400 stores a newly detected terminal status, "data access", in the region 702 as the second terminal status (S804).

Then, the judging unit 403 reads out, from the terminal status managing table 401, the first terminal status, "accessing address book", and the second terminal status, "data access". Based on these terminal statuses, the judging unit 403 then refers to the condition managing table 402 (S805), and judges whether or not the mobile terminal is in a status for which the electric power supply should start (S806).

More specifically, since the first terminal status is "accessing address book", and the second terminal status is "data access", the judging unit 403 refers to a record 919 in which, as shown in FIG. 8, the terminal status 900 is "accessing address book", and the post-action terminal status 902 is "data access" (S805). In this record 919, information which indicates "yes" is stored as the SD memory card use possibility 903. Therefore, the judging unit 403 judges that the mobile terminal is in a status for which the electric power supply should start (Y in S806). As a result, the electric power supply to the SD memory card starts. However, the description of this operation is omitted because it is the same as the operation described in the first embodiment.

As described above, according to the fourth embodiment, the electric power supply to the SD memory card starts when the action to edit data in the address book is performed. In other words, the electric power supply to the SD memory card does not start even when the address book application is activated, unless there is a need to make access to the SD memory card. Therefore, unnecessary consumption of electric power can be reduced.

Note that although, here, the electric power supply to the SD memory card does not start when the address book application is activated, the present invention is not limited to this. In other words, as in the first and the second embodiments, the electric power supply to the SD memory card may start when the address book application is activated.

Fifth Embodiment

In the fourth embodiment, the electric power supply to the SD memory card starts when the action to edit data in the address book is performed. However, the present invention is not limited to this. More specifically, as in the fourth embodiment, the electric power supply to the SD memory card may start when data access starts, irrespective of the format of the access.

Figure 14A:
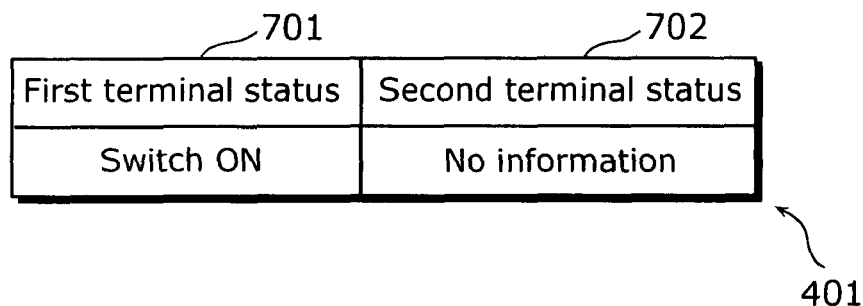
FIGS. 14A, 14B and 14C are diagrams showing contents of a terminal status managing table of a fifth embodiment.
Figure 14B:
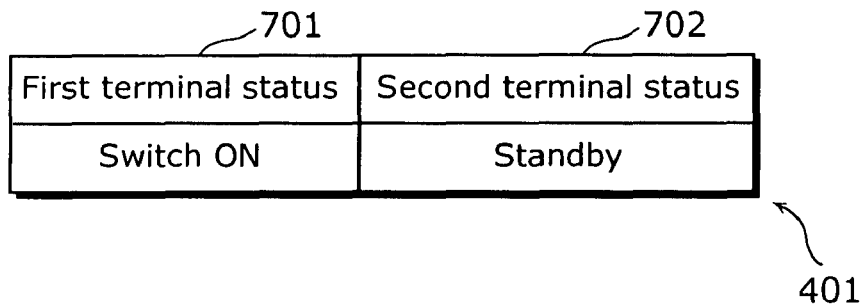

The following describes operations of the mobile terminal which are performed when an action to access a data folder is performed by the user. Since the basic operations are the same as the operations described in the first embodiment, the following describes operations in Step S810 and the subsequent steps which are shown in FIG. 9. Further, although FIGS. 14A, 14B and 14C are diagrams showing contents of the terminal status managing table 401 in the fifth embodiment, the description of the transit from FIG. 14A to FIG. 14B is omitted, because it is the same as the transit described in the first embodiment.

Figure 14C:
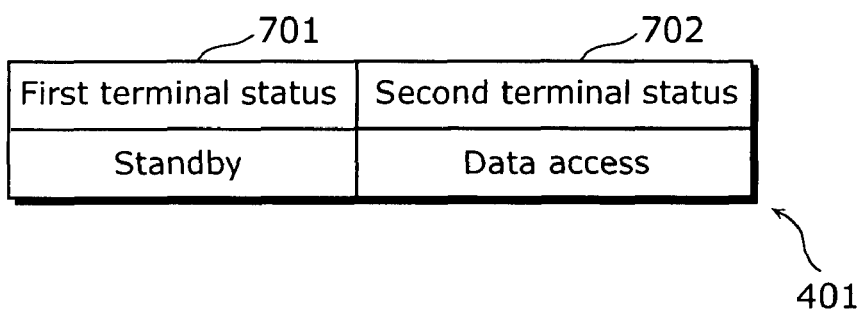

When detecting that the action to access the data folder is performed (Y in S810), the terminal status detecting unit 400 updates the terminal status managing table 401 as shown in FIG. 14C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "data access", in the region 702 as the second terminal status (S804).

Then, the judging unit 403 reads out, from the terminal status managing table 401, the first terminal status, "standby", and the second terminal status, "data access". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "data access", the judging unit 403 refers to a record 914 in which, as shown in FIG. 8, the terminal status 900 is "standby", and the post-action terminal status 902 is "data access" (S805). In this record 914, information which indicates "yes" is stored as the SD memory card use possibility 903. Therefore, the judging unit 403 judges that the mobile terminal is in a status for which the electric power supply should start (Y in S806). As a result, the electric power supply to the SD memory card starts. However, the description of this operation is omitted because it is the same as the operation described in the first embodiment.

As described above, according to the fifth embodiment, the electric power supply to the SD memory card starts when the action to access the data folder is performed. In other words, the electric power supply to the SD memory card does not start until then. Therefore, unnecessary consumption of electric power can be reduced.

Sixth Embodiment

Although in the first through fifth embodiments, the electric power supply to the SD memory card starts when an application is activated or when data access starts, the present invention is not limited to this. In other words, the electric power supply to the SD memory card may start when there is a change in a status of the hardware of the mobile terminal.

FIGS. 15A, 15B, 15C and 15D are diagrams showing a relationship between a folding-type mobile terminal and a condition for starting the electric power supply. Here, a description is provided on an assumption that an open judgment angle is set to be θ0, and that this θ0 is an angle larger than 0°, as shown in FIG. 15A.

As shown in FIG. 15B, a folding-type mobile terminal is usually closed in a standby status. An open angle θ1 of the mobile terminal in this status is 0° which is smaller than the open judgment angle θ0. Therefore, even if the SD memory card is inserted into the mobile terminal at this point of time, the electric power supply to the SD memory card does not start.

Next, as shown in FIG. 15C, even while the mobile terminal is half-opened, when an open angle θ2 is smaller than the open judgment angle θ0, the electric power supply to the SD memory card does not start, as described above.

Lastly, as shown in FIG. 15D, when an open angle θ3 of the mobile terminal reaches the judgment angle θ0 or above, the judging unit 403 judges that the mobile terminal is in a status for which the electric power supply should start, and notifies the controlling unit 301 of the judgment. As a result, the electric power supply to the SD memory card starts in the same procedure as the one described in the first embodiment.

As described above, according to the sixth embodiment, the electric power supply to the SD memory card starts when an open angle of the folding-type mobile terminal reaches the open judgment angle or above. In other words, the electric power supply to the SD memory card does not start until then. Therefore, unnecessary consumption of electric power can be reduced. In addition, since a mechanism which judges a condition for starting the electric power supply can be implemented with the hardware, there is an effect of reducing a load on the software.

Seventh Embodiment

Although, in the sixth embodiment, the mobile terminal has a folding-type shape, the present invention is not limited to this. In other words, even when the mobile terminal is a swivel-type mobile terminal or a sliding-type mobile terminal, the electric power supply to the SD memory card may start when there is a change in the status of the hardware, as in the sixth embodiment.

Figure 16A:
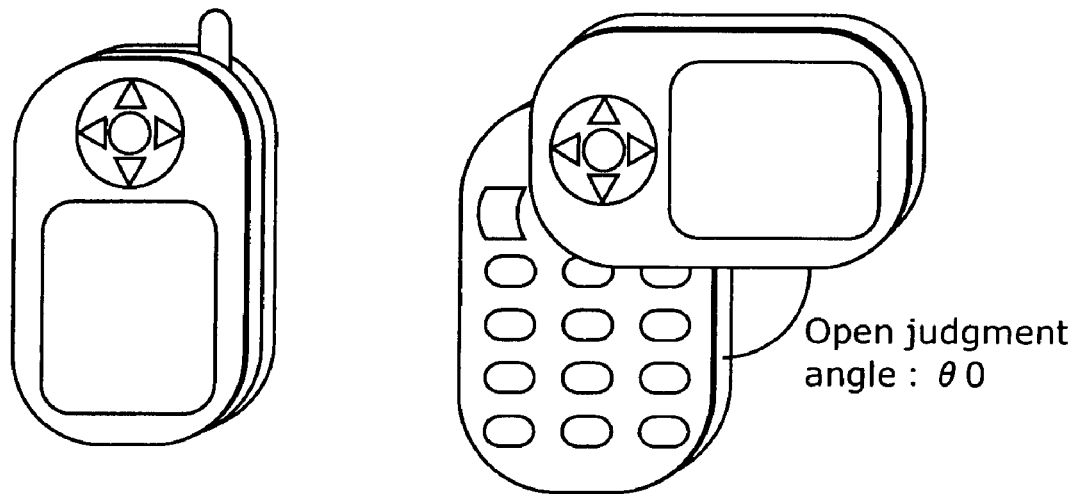
FIG. 16A is a diagram showing a relationship between a swivel-type mobile terminal and a condition for starting an electric power supply.

FIG. 16A is a diagram showing a relationship between a swivel-type mobile terminal and a condition for starting the electric power supply. Since the swivel-type mobile terminal opens sideways, an open judgment angle θ0 is also a sideways angle. In other words, when the open sideways angle reaches the open judgment angle θ0 or above, the electric power supply to the SD memory card starts in the same procedure as the one described in the sixth embodiment.

Figure 16B:
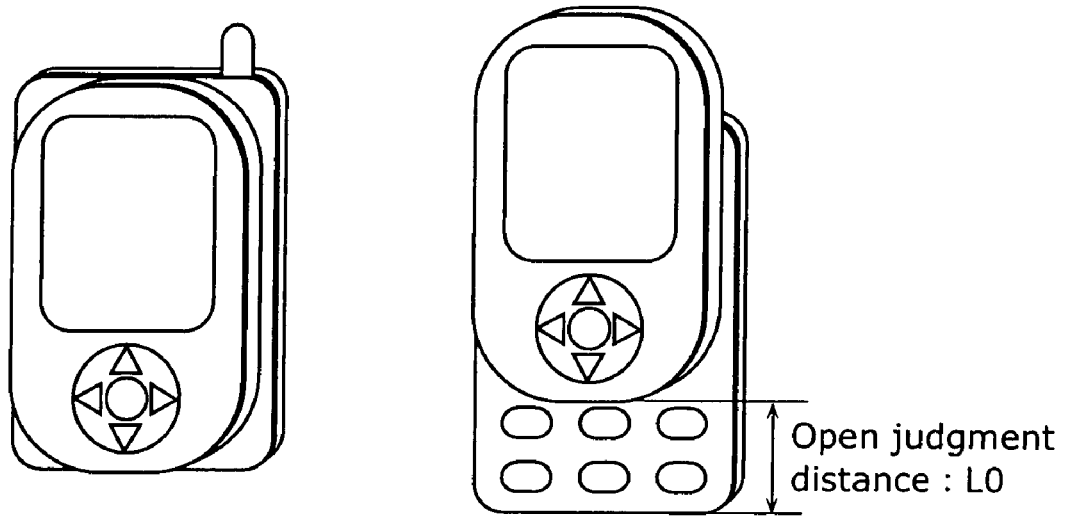
FIG. 16B is a diagram showing a relationship between a sliding-type mobile terminal and a condition for starting an electric power supply.

FIG. 16B is a diagram showing a relationship between a sliding-type mobile terminal and a condition for starting the electric power supply. Since the sliding-type mobile terminal has a structure, in which a part of the body slides, an open judgment is based on a sliding distance, rather than an angle. In other words, when an open distance reaches an open judgment distance L0 or above, the electric power supply to the SD memory card starts in the same procedure as the one described in the sixth embodiment.

As described above, according to the seventh embodiment, the electric power supply to the SD memory card starts when an open angle of the swivel-type mobile terminal reaches the open judgment angle or above, or when a sliding distance of the sliding-type mobile terminal reaches the open judgment distance or above. In other words, the electric power supply to the SD memory card does not start until then. Therefore, unnecessary consumption of electric power can be reduced. In addition, since the mechanism which judges a condition for starting the electric power supply can be implemented with the hardware, there is an effect of reducing a load on the software.

Eighth Embodiment

In the first through seventh embodiments, the description is provided using such an external memory as the SD memory card, as an example of an external memory which can operate only in contact communication. However, the present invention is not limited to this. In other words, it is also possible to adopt an external memory such as a smart SD card which can be used for contactless communication.

Figure 17:
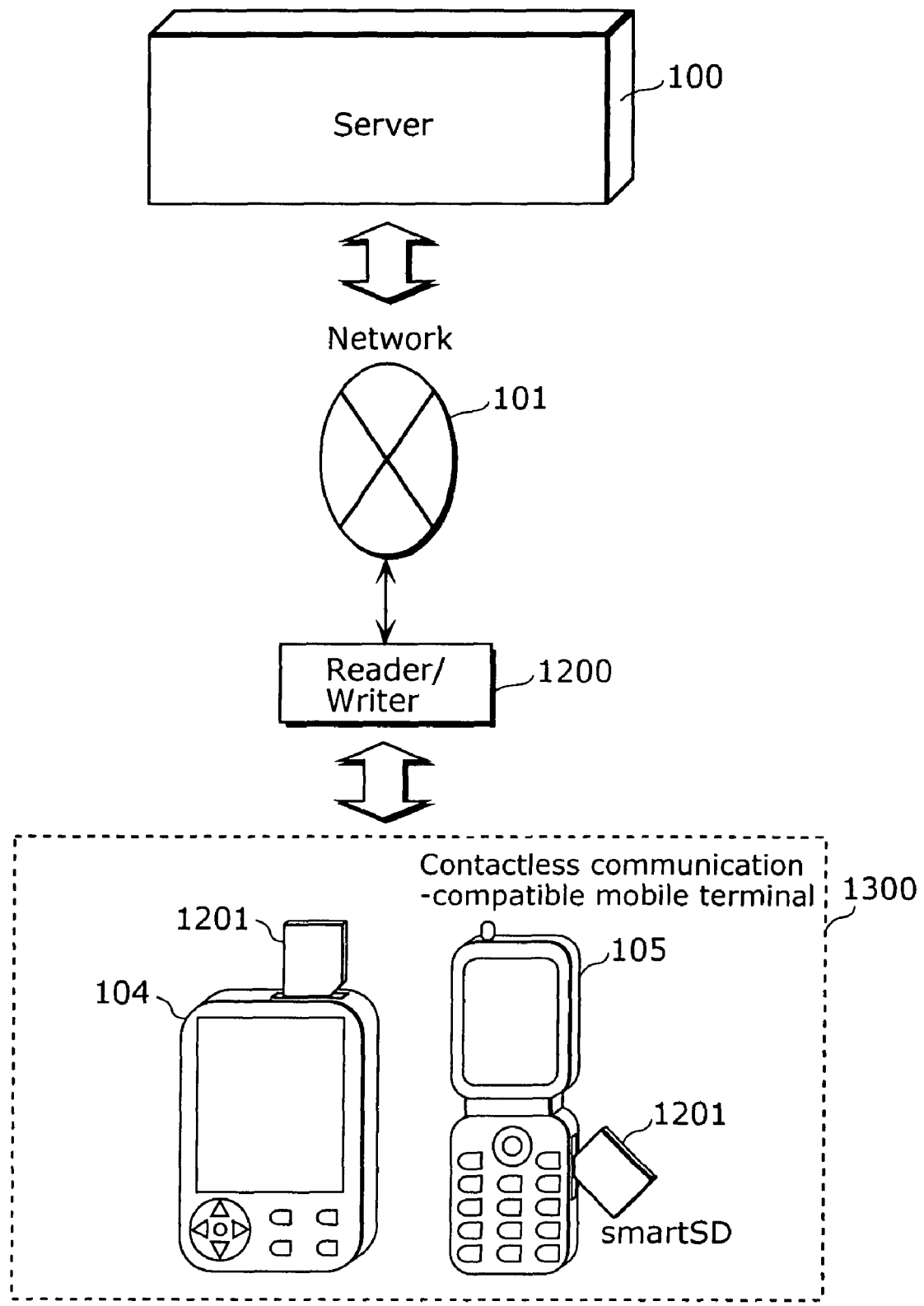
FIG. 17 is a diagram showing an overview of a usage pattern of a conventional contactless communication-compatible mobile terminal.

FIG. 17 is a diagram showing an overview of a usage pattern of a conventional contactless communication-compatible mobile terminal. The basic structure is the same as the one shown in FIG. 5. However, in order for a contactless communication-compatible mobile terminal 1300 to access the server 100 and the network 101, a reader/writer 1200 is required. A memory card which is to be inserted into the contactless communication-compatible mobile terminal 1300 is a contactless communication-compatible memory card 1201, such as a smart SD card.

Here, when being inserted into the contactless communication-compatible mobile terminal 1300, the contactless communication-compatible memory card 1201 can operate by receiving an electric power supply from the reader/writer 1200. In other words, the contactless communication-compatible memory card 1201 is different from the conventional memory card in that the contactless communication-compatible memory card 1201 can operate without receiving the electric power supply from the mobile terminal.

Figure 18:
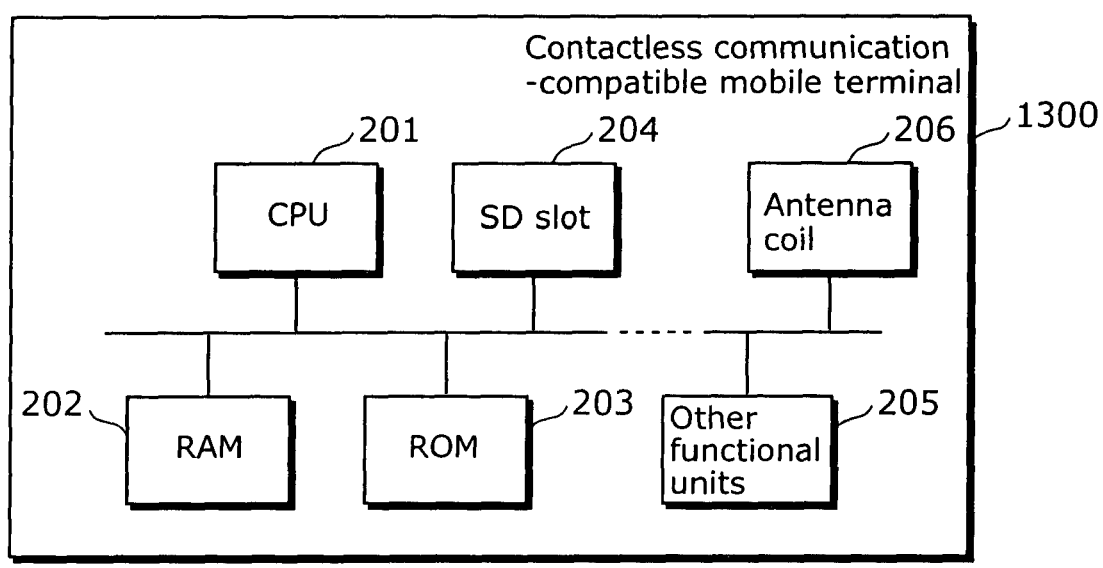
FIG. 18 is a diagram showing a hardware configuration of a mobile terminal which is compatible with a smart SD card.

FIG. 18 is a diagram showing a hardware configuration of a mobile terminal which is compatible with a smart SD card. The configuration is the same as that of the conventional mobile terminal in that the mobile terminal which is compatible with the smart SD card includes the CPU 201, the RAM 202, the ROM 203, the SD slot 204 and other functional units 205. However, the configuration is different from that of the conventional mobile terminal in that the mobile terminal which is compatible with the smart SD card includes an antenna coil 206 as a contactless communication interface.

Figure 19:
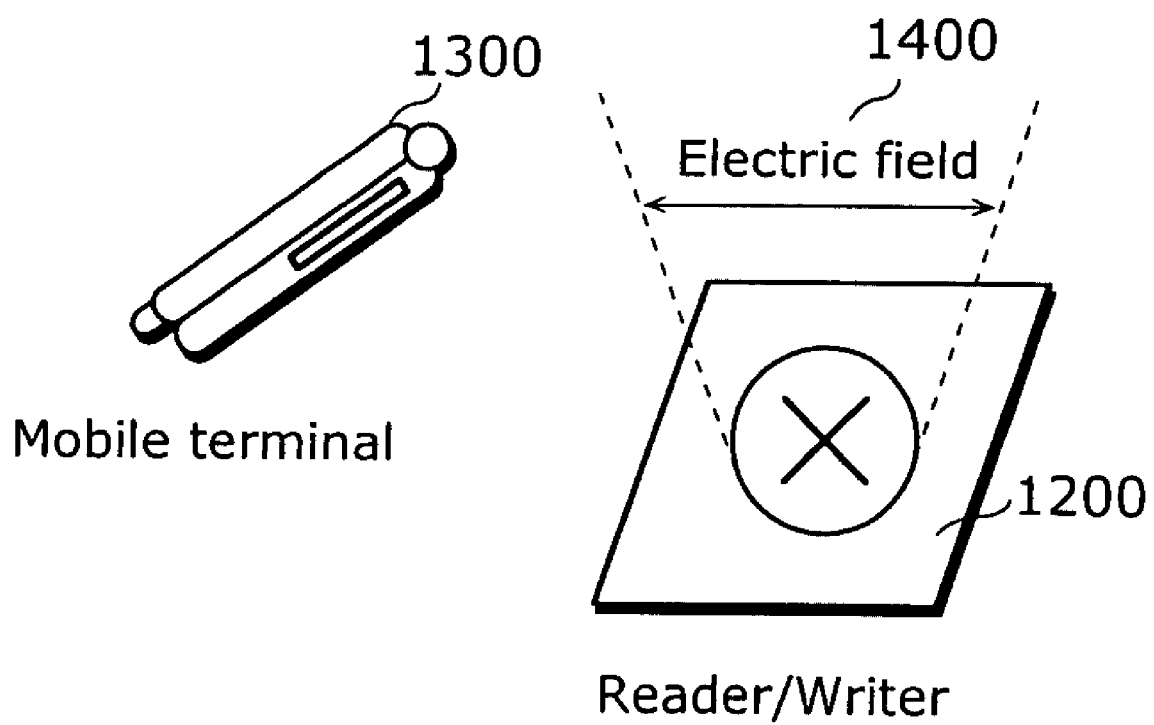
FIG. 19 is a diagram showing a relationship between a mobile terminal equipped with a contactless communication-compatible memory card, and a reader/writer.

FIG. 19 is a diagram showing a relationship between a mobile terminal equipped with a memory card which is compatible with contactless communication, and a reader/writer. When the user places the contactless communication-compatible mobile terminal 1300 in an electric field 1400 of the reader/writer 1200, the electric power from the reader/writer 1200 through the antenna coil 206 of the contactless communication-compatible mobile terminal 1300 can be received, thus enabling contactless communication. On the other hand, when the user removes the contactless communication-compatible mobile terminal 1300 from the electric field 1400 of the reader/writer 1200, the electric power supply from the reader/writer 1200 stops, and thus, the contactless communication cannot be performed.

In the eighth embodiment, a description is provided on a case where the mobile terminal is a contactless communication-compatible mobile terminal, and its external memory is a smart SD card. Since the basic operations are the same as the operations described in the first embodiment, the following describes operations in Step S810 and the subsequent steps which are shown in FIG. 9. Further, although FIGS. 20A, 20B, 20C and 20D are diagrams showing contents of the terminal status managing table 401 of the eighth embodiment, the description of the transit from FIG. 20A to FIG. 20B is omitted, because it is the same as the transit described in the first embodiment.

When detecting that the contactless communication-compatible mobile terminal 1300 is placed in the electric field 1400 of the reader/writer (Y in S810), the terminal status detecting unit 400 updates the terminal status managing table 401, as shown in FIG. 20C. More specifically, the terminal status detecting unit 400 transits the second terminal status, "standby", stored in the region 702, to the first terminal status for storage in the region 701 (S811). Further, the terminal status detecting unit 400 stores a newly detected terminal status, "contactless communication", in the region 702 as the second terminal status (S804).

Then, the judging unit 403 reads out, from the terminal status managing table 401, the first terminal status, "standby", and the second terminal status, "contactless communication". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "contactless communication", the judging unit 403 refers to a record 921 in which, as shown in FIG. 8, the terminal status 900 is "standby", and the post-action terminal status 902 is "contactless communication" (S805). In this record 921, information which indicates "no" is stored as the SD memory card use possibility 903. Therefore, the judging unit 403 judges that the mobile terminal is in a status for which the electric power supply should not start (N in S806). In such case, the judging unit 403 enters the standby status, and thus the electric power supply to the smart SD card does not start.

Next, when detecting that the contactless communication-compatible mobile terminal 1300 is removed from the electric field 1400 of the reader/writer (Y in S810), the terminal status detecting unit 400 updates the terminal status managing table 401, as shown in FIG. 20D. More specifically, the terminal status detecting unit 400 transits the second terminal status, "contactless communication", stored in the region 702, to the first terminal status for storage in the region 701 (S811). Further, the terminal status detecting unit 400 stores a newly detected terminal status, "standby", in the region 702 as the second terminal status (S804).

Then, the judging unit 403 reads out, from the terminal status managing table 401, the first terminal status, "contactless communication", and the second terminal status, "standby". Based on these terminal statuses, the judging unit 403 then refers to the condition managing table 402 (S805), and judges whether or not the mobile terminal is in a status for which the electric power supply should start (S806).

More specifically, since the first terminal status is "contactless communication", and the second terminal status is "standby", the judging unit 403 refers to a record 922 in which, as shown in FIG. 8, the terminal status 900 is "contactless communication" and the post-action terminal status 902 is "standby" (S805). In this record 922, information which indicates "yes" is stored as the SD memory card use possibility 903. Therefore, the judging unit 403 judges that the mobile terminal is in a status for which the electric power supply should start (Y in S806). As a result, the electric power supply to the smart SD card starts. However, the description of this operation is omitted because it is the same as the operation described in the first embodiment.

As described above, according to the eighth embodiment, the electric power supply to the smart SD card starts when contactless communication finishes. In other words, the electric power supply to the smart SD card does not start when the contactless communication which does not require the electric power supply is in progress. Therefore, unnecessary consumption of electric power can be reduced. In addition to this effect, there is also an effect that the system can be simplified, because the system only needs to judge whether or not contactless communication is in progress.

Ninth Embodiment

Although, in the eighth embodiment, the electric power supply to the smart SD card starts when contactless communication finishes, the present invention is not limited to this. More specifically, it is assumed in the eighth embodiment that data in the smart SD card is referred to immediately after contactless communication finishes. However, there are various purposes for referring to the data in the smart SD card. For example, there is a case where, after contactless communication finishes, data in the smart SD card is referred to for the purpose of carrying out billing processing arising from the contactless communication. In such case, it is unnecessary to start supplying electric power to the smart SD card even when the contactless communication finishes, unless a billing application is activated.

The following describes operations of the mobile terminal which are performed when the billing application is activated. The billing application is an application which has a function to perform billing-related processing. Here, the term, billing, is a fee charged for a service received via contactless communication.

Since the basic operations are the same as the operations described in the eighth embodiment, the following describes operations in Step S810 and the subsequent steps which are shown in FIG. 9. Further, although FIGS. 21A, 21B, 21C, 21D and 21E are diagrams showing contents of the terminal status managing table 401 of the ninth embodiment, the description of the transit through FIGS. 21A to 21C is omitted, because it is the same as the transit described in the eighth embodiment. In addition, FIG. 22 is a diagram showing contents of a condition managing table 402 of the ninth embodiment.

When detecting that the contactless communication-compatible mobile terminal 1300 is removed from the electric field 1400 of the reader/writer (Y in S810), the terminal status detecting unit 400 updates the terminal status managing table 401, as shown in FIG. 21D. More specifically, the terminal status detecting unit 400 transits the second terminal status, "contactless communication", stored in the region 702, to the first terminal status for storage in the region 701 (S811). Further, the terminal status detecting unit 400 stores a newly detected terminal status, "standby", in the region 702 as the second terminal status (S804).

Then, the judging unit 403 reads out, from the terminal status managing table 401, the first terminal status, "contactless communication", and the second terminal status, "standby". Based on these terminal statuses, the judging unit 403 then refers to the condition managing table 402 (S805), and judges whether or not the mobile terminal is in a status for which the electric power supply should start (S806).

More specifically, since the first terminal status is "contactless communication", and the second terminal status is "standby", the judging unit 403 refers to a record 923 in which, as shown in FIG. 22, the terminal status 900 is "contactless communication" and the post-action terminal status 902 is "standby" (S805). In this record 923, information which indicates "no" is stored as the SD memory card use possibility 903. Therefore, the judging unit 403 judges that the mobile terminal is in a status for which the electric power supply should not start (N in S806).

Next, when detecting that the billing application is activated (Y in S810), the terminal status detecting unit 400 updates the terminal status managing table 401 as shown in FIG. 21E. More specifically, the terminal status detecting unit 400 transits the second terminal status, "standby", stored in the region 702, to the first terminal status for storage in the region 701 (S811). Further, the terminal status detecting unit 400 stores a newly detected terminal status, "billing processing", in the region 702 as the second terminal status (S804).

Then, the judging unit 403 reads out, from the terminal status managing table 401, the first terminal status, "standby", and the second terminal status, "billing processing". Based on these terminal statuses, the judging unit 403 then refers to the condition managing table 402 (S805), and judges whether or not the mobile terminal is in a status for which the electric power supply should start (S806).

More specifically, since the first terminal status is "standby", and the second terminal status is "billing processing", the judging unit 403 refers to a record 924 in which, as shown in FIG. 22, the terminal status 900 is "standby", and the post-action terminal status 902 is "billing processing" (S805). In this record 924, information which indicates "yes" is stored as the SD memory card use possibility 903. Therefore, the judging unit 403 judges that the mobile terminal is in a status for which the electric power supply should start (Y in S806). As a result, the electric power supply to the smart SD card starts. However, the description of this operation is omitted because it is the same as the operation described in the first embodiment.

As described above, according to the ninth embodiment, the electric power supply to the smart SD card starts when the billing application is activated. In other words, the electric power supply to the smart SD card does not start, not only when contactless communication which does not require the electric power supply is in progress, but also when the contactless communication finishes, unless there is a need to make access to the smart SD card. Therefore, unnecessary consumption of electric power can be reduced.

Note that although, here, the description is provided using a smart SD card, as an example of an external memory card which is compatible with contactless communication, the present invention is not limited to this. More specifically, when the billing application is activated, the electric power supply to an external memory which is not compatible with contactless communication may start.

Supplement 1 to First Through Ninth Embodiments

As in the above description, the first through ninth embodiments are described. Each function of the controlling unit 301, the electric power supplying unit 302, the recognition processing unit 303, the SD slot status detecting unit 304, the terminal status detecting unit 400 and the judging unit 403 is typically embodied through a computer program executed by the CPU. The program may be previously stored in the ROM in the mobile terminal, or may be stored in the non-volatile memory in the mobile terminal after the program is downloaded from an external resource.

Supplement 2 to First Through Ninth Embodiments

Further, in some cases, the functions of the above mentioned units may be embodied by an LSI, that is, an integrated circuit, by combining with the CPU, the RAM, the ROM, the non-volatile memory, and the like. Each of these functions may be incorporated into a chip or may be incorporated into a chip in units of groups.

Figure 23:
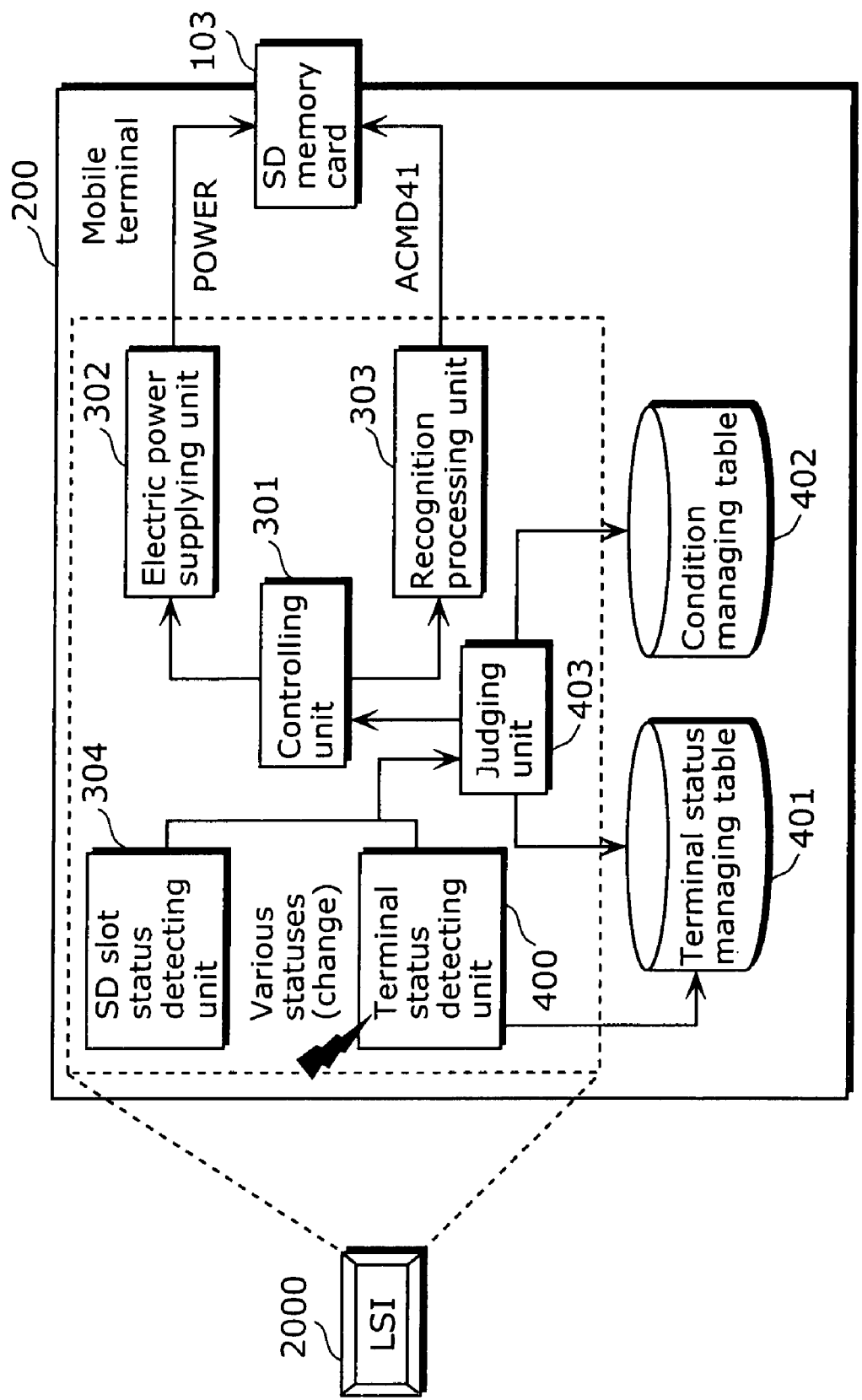
FIG. 23 is a diagram showing an example of the case of incorporating, into an integrated circuit, characteristic structural units of the mobile terminal according to the first through ninth embodiments.

FIG. 23 is a diagram showing an example of the case of incorporating, into an integrated circuit, characteristic structural units of the mobile terminal according to the first through ninth embodiments. An LSI 2000 is an example of such integrated circuit, and embodies the functions of the components included in the range indicated by a dotted line in the diagram. There are cases where the integrated circuit is called "IC", "system LSI", "super LSI" and "ultra LSI", depending on the degree of integration.

Further, the integrated circuit is not limited to such LSI, and may be embodied by a private circuit or a conventional processor. A Field Programmable Gate Array (FPGA) which can store programs after the manufacturing of an LSI, or a reconfigurable processor which can reconfigure, after the manufacturing of an LSI, connection and setting of a circuit cell included in the LSI may be used instead. When a progress in semiconductor technology or another technology deriving from the semiconductor technology leads to an introduction of a new technology (for example, biotechnology and organic chemistry technology) for the incorporation of components into an integrated circuit which replaces the LSI, the above mentioned functions equipped in the mobile terminal may surely be integrated using such new technology.

INDUSTRIAL APPLICABILITY

The mobile terminal of the present invention is effective in reducing unnecessary consumption of electric power, and is useful as a mobile phone, a PDA and the like.

The invention claimed is:

1. A mobile terminal to which an external memory can be inserted, said mobile terminal comprising:
    a terminal status detecting unit configured to detect a first terminal status and a second terminal status, the first terminal status being a status of an application program before a change occurs to the application program, and the second terminal status being a status of the application program after the change occurs to the application program, the application program being installed in said mobile terminal;
    an SD slot status detecting unit configured to detect that the external memory is inserted into said mobile terminal;
    a condition storing unit configured to store a condition which includes a combination of (i) pre-action terminal status information indicating a pre-action terminal status that is a status of the application program before an action is taken on the application program, (ii) post-action terminal status information indicating a post-action terminal status that is a status of the application program after the action is taken on the application program, and (iii) use possibility information indicating whether or not there is a possibility to use the external memory;
    a judging unit configured to (i) check from the use possibility information, based on the condition stored in said condition storing unit, whether or not there is a possibility to use the external memory when the first terminal status indicates the pre-action terminal status and the second terminal status indicates the post-action terminal status, said judging unit performing the check when said terminal status detecting unit detects the first terminal status and the second terminal status in a state where said SD slot status detecting unit detects that the external memory is inserted into said mobile terminal, (ii) judge that electric power supply to the external memory should start when it is checked that there is a possibility to use the external memory, and (iii) judge that the electric power supply to the external memory should not start when it is checked that there is no possibility to use the external memory; and an electric power supplying unit configured to start the electric power supply to the external memory when said judging unit judges that the electric power supply to the external memory should start, and to cancel the electric power supply to the external memory when said judging unit judges that the electric power supply to the external memory should not start.

2. The mobile terminal according to claim 1,
wherein said terminal status detecting unit is configured to detect the first terminal status and the second terminal status, the first terminal status being a status before activation of an image reproduction application program, and the second terminal status being a status after activation of the image reproduction application program, the image reproduction application program having a function to reproduce an image, and said condition storing unit is configured to store the condition which includes a combination of (i) the pre-action terminal status information indicating the status before activation of the image reproduction application program, (ii) the post-action terminal status information indicating the status after activation of the image reproduction application program, and (iii) the use possibility information indicating that there is a possibility to use the external memory.

3. The mobile terminal according to claim 1,
wherein said terminal status detecting unit is configured to detect the first terminal status and the second terminal status, the first terminal status being a status before activation of an image recording application program, and the second terminal status being a status after activation of the image recording application program, the image recording application program having a function to record an image received by a television-equipped mobile terminal, and said condition storing unit is configured to store the condition which includes a combination of (i) the pre-action terminal status information indicating the status before activation of the image recording application program, (ii) the post-action terminal status information indicating the status after activation of the image recording application program, and (iii) the use possibility information indicating that there is a possibility to use the external memory.

4. The mobile terminal according to claim 1,
wherein said terminal status detecting unit is configured to detect the first terminal status and the second terminal status, the first terminal status being a status before activation of an address book application program, and the second terminal status being a status after activation of the address book application program, the address book application program having a function to edit data in an address book, and said condition storing unit is configured to store the condition which includes a combination of (i) the pre-action terminal status information indicating the status before activation of the address book application program, (ii) the post-action terminal status information indicating the status after activation of the address book application program, and (iii) the use possibility information indicating that there is a possibility to use the external memory.

5. The mobile terminal according to claim 1,
wherein said terminal status detecting unit is configured to detect the first terminal status and the second terminal status, the first terminal status being a status before activation of a billing application program, and the second terminal status being a status after activation of the billing application program, the billing application program having a function to perform billing-related processing, and said condition storing unit is configured to store the condition which includes a combination of (i) the pre-action terminal status information indicating the status before activation of the billing application program, (ii) the post-action terminal status information indicating the status after activation of the billing application program, and (iii) the use possibility information indicating that there is a possibility to use the external memory.

6. The mobile terminal according to claim 1,
wherein said terminal status detecting unit is configured to detect the first terminal status and the second terminal status, the first terminal status being a status before the application program starts data access, and the second terminal status being a status after the application program starts data access, and said condition storing unit is configured to store the condition which includes a combination of (i) the pre-action terminal status information indicating the status before the application program starts data access, (ii) the post-action terminal status information indicating the status after the application program starts data access, and (iii) the use possibility information indicating that there is a possibility to use the external memory.

7. The mobile terminal according to claim 1,
wherein the condition stored in said condition storing unit is updated by being downloaded from an external network.

8. A mobile terminal to which an external memory can be inserted, said mobile terminal comprising:

a terminal status detecting unit configured to detect a first terminal status and a second terminal status, the first terminal status being a status before activation of a music reproduction application program, and the second terminal status being a status after activation of the music reproduction application program, the music reproduction application program having a function to reproduce music;

an SD slot status detecting unit configured to detect that the external memory is inserted into said mobile terminal;

a condition storing unit configured to store a condition which includes a combination of (i) pre-action terminal status information indicating a pre-action terminal status that is the status before activation of the music reproduction application program, (ii) post-action terminal status information indicating a post-action terminal status that is the status after activation of the music reproduction application program, and (iii) use possibility information indicating that there is a possibility to use the external memory;

a judging unit configured to (i) check from the use possibility information, based on the condition stored in said condition storing unit, whether or not there is a possibility to use the external memory when the first terminal status indicates the pre-action terminal status and the second terminal status indicates the post-action terminal status, said judging unit performing the check when said terminal status detecting unit detects the first terminal status and the second terminal status in a state where said SD slot status detecting unit detects that the external memory is inserted into said mobile terminal, (ii) judge that electric power supply to the external memory should start when it is checked that there is a possibility to use the external memory, and (iii) judge that the electric power supply to the external memory should not start when it is checked that there is no possibility to use the external memory; and an electric power supplying unit configured to start the electric power supply to the external memory when said judging unit judges that the electric power supply to the external memory should start, and to cancel the electric power supply to the external memory when said judging unit judges that the electric power supply to the external memory should not start.

9. A mobile terminal to which an external memory can be inserted, said mobile terminal comprising:

a terminal status detecting unit configured to detect a first terminal status and a second terminal status, the first terminal status being a status before a change occurs in contactless communication that the external memory performs, and the second terminal status being a status after the change occurs in the contactless communication;

an SD slot status detecting unit configured to detect that the external memory is inserted into said mobile terminal;

a condition storing unit configured to store a condition which includes a combination of (i) pre-action terminal status information indicating a pre-action terminal status that is the status before the change occurs in the contactless communication, (ii) post-action terminal status information indicating a post-action terminal status that is the status after the change occurs in the contactless communication, and (iii) use possibility information indicating whether or not there is a possibility to use the external memory;

a judging unit configured to (i) check from the use possibility information, based on the condition stored in said condition storing unit, whether or not there is a possibility to use the external memory when the first terminal status indicates the pre-action terminal status and the second terminal status indicates the post-action terminal status, said judging unit performing the check when said terminal status detecting unit detects the first terminal status and the second terminal status in a state where said SD slot status detecting unit detects that the external memory is inserted into said mobile terminal, (ii) judge that electric power supply to the external memory should start when it is checked that there is a possibility to use the external memory, and (iii) judge that the electric power supply to the external memory should not start when it is checked that there is no possibility to use the external memory; and an electric power supplying unit configured to start the electric power supply to the external memory when said judging unit judges that the electric power supply to the external memory should start, and to cancel the electric power supply to the external memory when said judging unit judges that the electric power supply to the external memory should not start.

10. The mobile terminal according to claim 9, wherein said terminal status detecting unit is configured to detect the first terminal status and the second terminal status, the first terminal status being a status before the contactless communication performed by the external memory is finished, and the second terminal status being a status after the contactless communication is finished, and said condition storing unit is configured to store the condition which includes a combination of (i) the pre-action terminal status information indicating the status before the contactless communication is finished, (ii) the post-action terminal status information indicating the status after the contactless communication is finished, and (iii) the use possibility information indicating that there is a possibility to use the external memory.

11. The mobile terminal according to claim 9, wherein said terminal status detecting unit is configured to detect the first terminal status and the second terminal status, the first terminal status being a status before activation of a billing application program, and the second terminal status being a status after activation of the billing application program, the billing application program having a function to perform billing-related processing, and said condition storing unit is configured to store the condition which includes a combination of (i) the pre-action terminal status information indicating the status before activation of the billing application program, (ii) the post-action terminal status information indicating the status after activation of the billing application program, and (iii) the use possibility information indicating that there is a possibility to use the external memory.

12. An electric power supplying method for supplying electric power to an external memory inserted to a mobile terminal, said electric power supplying method comprising:

a terminal status detecting step of detecting a first terminal status and a second terminal status, the first terminal status being a status of an application program before a change occurs to the application program, and the second terminal status being a status of the application program after the change occurs to the application program, the application program being installed in the mobile terminal;

an SD slot status detecting step of detecting that the external memory is inserted into the mobile terminal;

a judging step of (i) checking from use possibility information, based on a condition which includes a combination of: (a) pre-action terminal status information indicating a pre-action terminal status that is a status of the application program before an action is taken on the application program; (b) post-action terminal status information indicating a post-action terminal status that is a status of the application program after the action is taken on the application program; and (c) the use possibility information indicating whether or not there is a possibility to use the external memory, whether or not there is a possibility to use the external memory when the first terminal status indicates the pre-action terminal status and the second terminal status indicates the post-action terminal status, said checking being performed when the first terminal status and the second terminal status are detected in said terminal status detecting step in a state where it is detected, in said SD slot status detecting step, that the external memory is inserted into the mobile terminal, (ii) judging that electric power supply to the external memory should start when it is checked that there is a possibility to use the external memory, and (iii) judging that the electric power supply to the external memory should not start when it is checked that there is no possibility to use the external memory; and an electric power supplying step of starting the electric power supply to the external memory when it is judged, in said judging step, that the electric power supply to the external memory should start, and cancelling the electric power supply to the external memory when it is judged, in said judging step, that the electric power supply to the external memory should not start.

13. An integrated circuit used for a mobile terminal to which an external memory can be inserted, said integrated circuit comprising:

a terminal status detecting unit configured to detect a first terminal status and a second terminal status, the first terminal status being a status of an application program before a change occurs to the application program, and the second terminal status being a status of the application program after the change occurs to the application program, the application program being installed in said mobile terminal;

an SD slot status detecting unit configured to detect that the external memory is inserted into said mobile terminal;

a condition storing unit configured to store a condition which includes a combination of (i) pre-action terminal status information indicating a pre-action terminal status that is a status of the application program before an action is taken on the application program, (ii) post-action terminal status information indicating a post-action terminal status that is a status of the application program after the action is taken on the application program, and (iii) use possibility information indicating whether or not there is a possibility to use the external memory;

a judging unit configured to (i) check from the use possibility information, based on the condition stored in said condition storing unit, whether or not there is a possibility to use the external memory when the first terminal status indicates the pre-action terminal status and the second terminal status indicates the post-action terminal status, said judging unit performing the check when said terminal status detecting unit detects the first terminal status and the second terminal status in a state where said SD slot status detecting unit detects that the external memory is inserted into said mobile terminal, (ii) judge that electric power supply to the external memory should start when it is checked that there is a possibility to use the external memory, and (iii) judge that the electric power supply to the external memory should not start when it is checked that there is no possibility to use the external memory; and an electric power supplying unit configured to start the electric power supply to the external memory when said judging unit judges that the electric power supply to the external memory should start, and to cancel the electric power supply to the external memory when said judging unit judges that the electric power supply to the external memory should not start.

\* \* \* \* \*

UNITED STATES PATENT AND TRADEMARK OFFICE
CERTIFICATE OF CORRECTION

| | | |
|---|---|---|
| PATENT NO. | : 7,948,356 B2 | Page 1 of 1 |
| APPLICATION NO. | : 11/666688 | |
| DATED | : May 24, 2011 | |
| INVENTOR(S) | : Hiromi Kawamura et al. | |

It is certified that error appears in the above-identified patent and that said Letters Patent is hereby corrected as shown below:

On the Cover Page

Please insert the following section (30) between sections (65) and (51) on the cover page of the patent:

--(30)     Foreign Application Priority Data

November 4, 2004     (JP) ............................2004-320498--

Signed and Sealed this
Sixteenth Day of August, 2011

David J. Kappos
*Director of the United States Patent and Trademark Office*